(12) United States Patent
Sakakibara et al.

(10) Patent No.: US 9,246,398 B2
(45) Date of Patent: Jan. 26, 2016

(54) POWER CONVERTER

(75) Inventors: Kenichi Sakakibara, Kusatsu (JP);
Keisuke Ohta, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 32 days.

(21) Appl. No.: 14/347,221

(22) PCT Filed: Jun. 1, 2012

(86) PCT No.: PCT/JP2012/064304
§ 371 (c)(1),
(2), (4) Date: Mar. 25, 2014

(87) PCT Pub. No.: WO2013/046805
PCT Pub. Date: Apr. 4, 2013

(65) Prior Publication Data
US 2014/0328091 A1    Nov. 6, 2014

(30) Foreign Application Priority Data

Sep. 26, 2011  (JP) .................................. 2011-208788
May 25, 2012   (JP) .................................. 2012-120205

(51) Int. Cl.
*H02M 5/458* (2006.01)
*H02M 1/12* (2006.01)
(Continued)

(52) U.S. Cl.
CPC .............. *H02M 5/458* (2013.01); *H02M 1/15* (2013.01); *H02M 7/4826* (2013.01); *H02M 7/53875* (2013.01)

(58) Field of Classification Search
CPC ............ H02M 7/53875; H02M 5/458; H02M 5/4585; H02M 1/12; H02M 3/33507
USPC .................. 363/34, 37, 39, 40, 95, 96, 97, 98
See application file for complete search history.

(56) References Cited

U.S. PATENT DOCUMENTS 5,621,628 A * 4/1997 Miyazaki et al. ............... 363/37
6,166,929 A * 12/2000 Ma et al. ......................... 363/37
(Continued)

FOREIGN PATENT DOCUMENTS

JP          61-48356 B2    10/1986
JP       2001-289549 A     10/2001
(Continued)

OTHER PUBLICATIONS

International Preliminary Report of corresponding PCT Application No. PCT/JP2012/064304.
(Continued)

*Primary Examiner* — Timothy J Dole
*Assistant Examiner* — Sisay G Tiku
(74) *Attorney, Agent, or Firm* — Global IP Counselors

(57) ABSTRACT

A power converter includes a rectifier section, an inverter section, a capacitance element connected between inverter section input ends, an inductance element forming part of an LC filter with the capacitance element, a voltage detector detecting an inductance element voltage, and a controller controlling the inverter section based on the detected voltage. The LC filter has a resonance frequency set such that ripple current components contained in DC current outputted from the rectifier section passes through, and current components of a frequency equal to a carrier frequency of the inverter section are dampened. The controller controls the inverter section so that a transfer characteristic of input voltage of the inverter section versus the DC voltage from the rectifier section becomes a damping characteristic given by a phase lead element and a second-order lag element connected in series, and a damping coefficient of the transfer characteristic is set larger than 1.

19 Claims, 39 Drawing Sheets

(51) Int. Cl.
*H02M 3/335* (2006.01)
*H02M 7/5387* (2007.01)
*H02M 7/48* (2007.01)
*H02M 1/15* (2006.01)

(56) References Cited

U.S. PATENT DOCUMENTS

| | | | |
|---|---|---|---|
| 8,842,453 B2* | 9/2014 | Cai et al. | 363/65 |
| 2009/0237961 A1* | 9/2009 | Sakakibara et al. | 363/37 |
| 2011/0176340 A1 | 7/2011 | Sakakibara | |

FOREIGN PATENT DOCUMENTS

| | | |
|---|---|---|
| JP | 2007-202378 A | 8/2007 |
| JP | 2008-29151 A | 2/2008 |
| JP | 4488122 B | 4/2010 |
| JP | 2010-187521 A | 8/2010 |

OTHER PUBLICATIONS

International Search Report of corresponding PCT Application No. PCT/JP2012/064304.
European Search Report of corresponding EP Application No. 12 83 5786.0 dated Jul. 10, 2015.

* cited by examiner

Fig.4

$$G(s) = \frac{V_c}{V_s} = \frac{\frac{kLs+1}{Ls}}{1+\frac{kLs+1}{Ls}\frac{1}{Cs}}\frac{1}{Cs} = \frac{kLs+1}{LCs^2+kLs+1}$$

$$= \frac{ks/C+1/LC}{s^2+ks/C+1/LC} = (kLs+1)\frac{1/LC}{s^2+ks/C+1/LC}$$

$$f_1 = \frac{1}{2\pi kL}$$

$$f_2 = \frac{1}{2\pi\sqrt{LC}}, \zeta = \frac{k}{2}\sqrt{\frac{L}{C}}$$

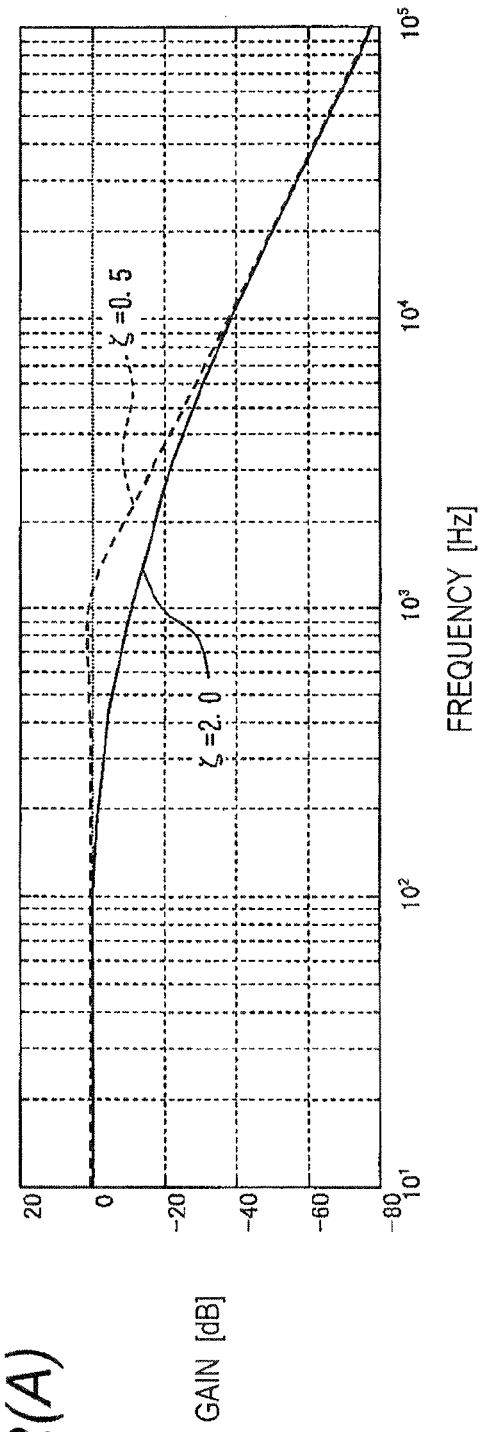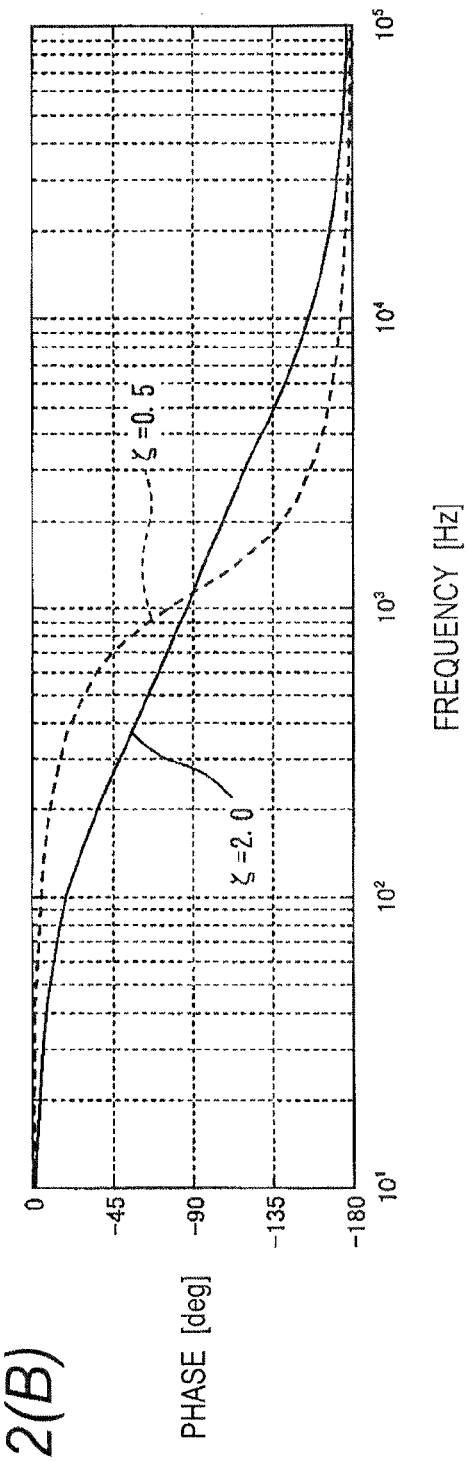
Fig. 12(A)
Fig. 12(B)

ζ=0.5

ζ=0.5

ζ=1.5

ζ=1.5

ζ=0.5

ζ=0.5

ζ=4.0

ζ=4.0

TIME [sec]

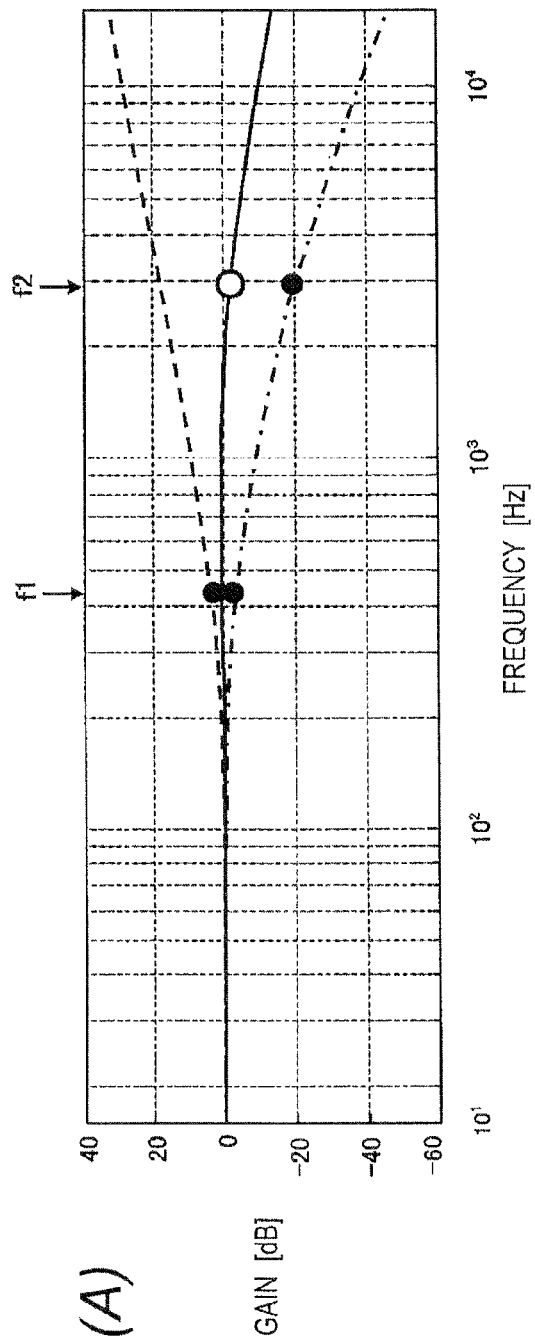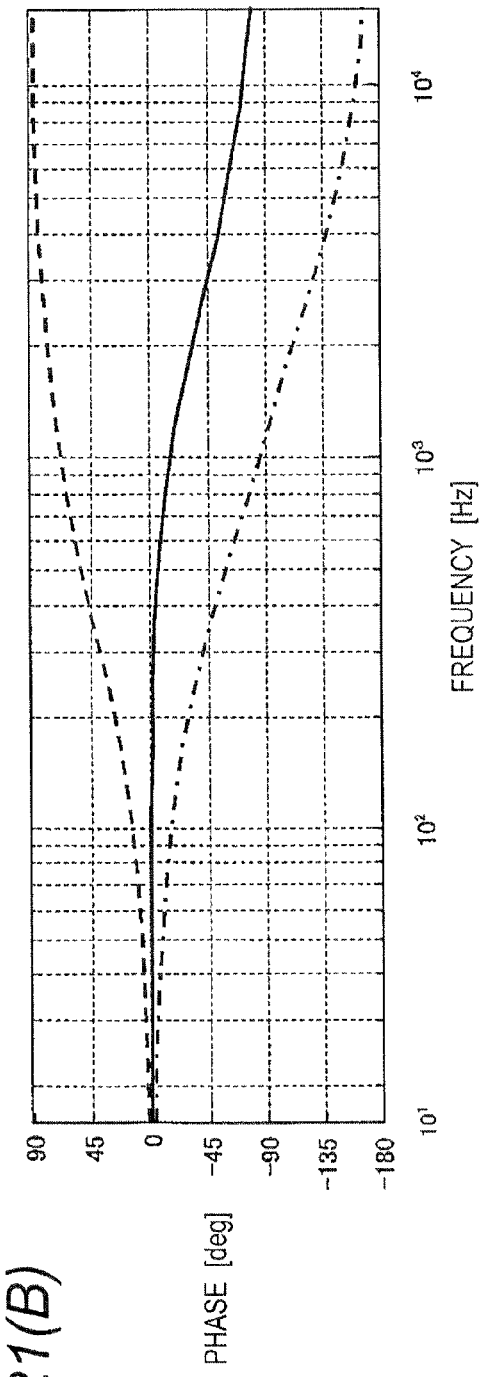
Fig.21(A)
Fig.21(B)

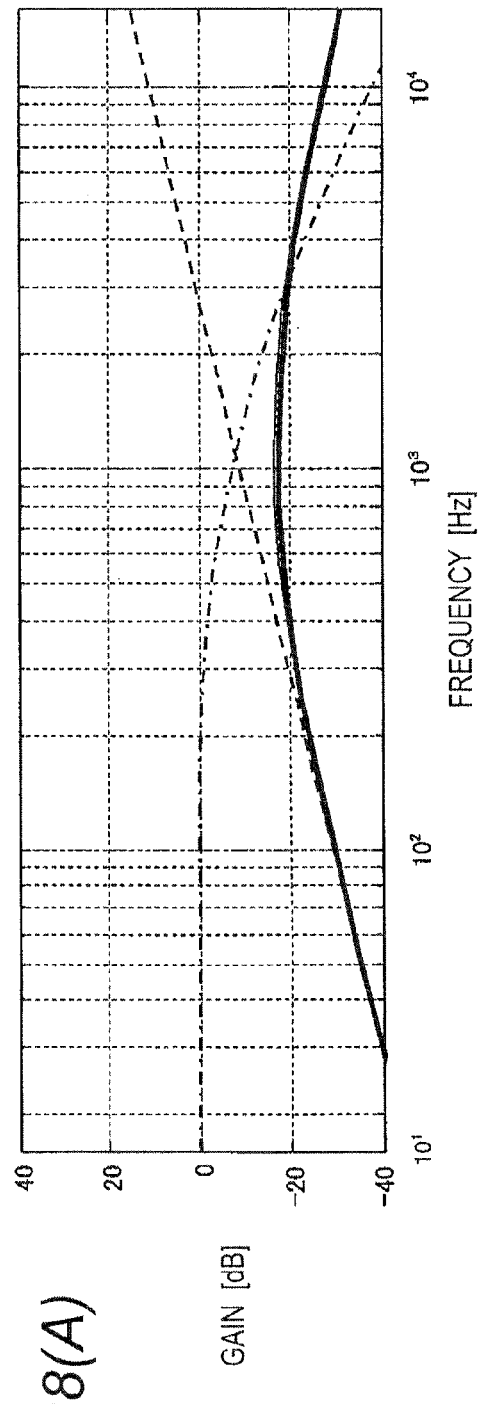
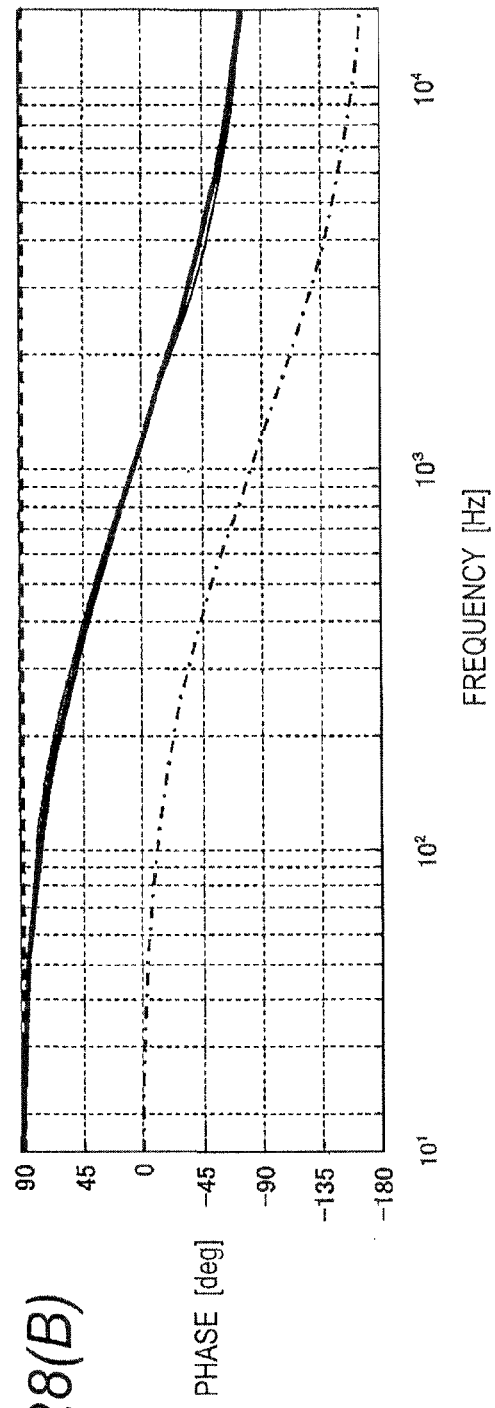
Fig.28(A)
Fig.28(B)

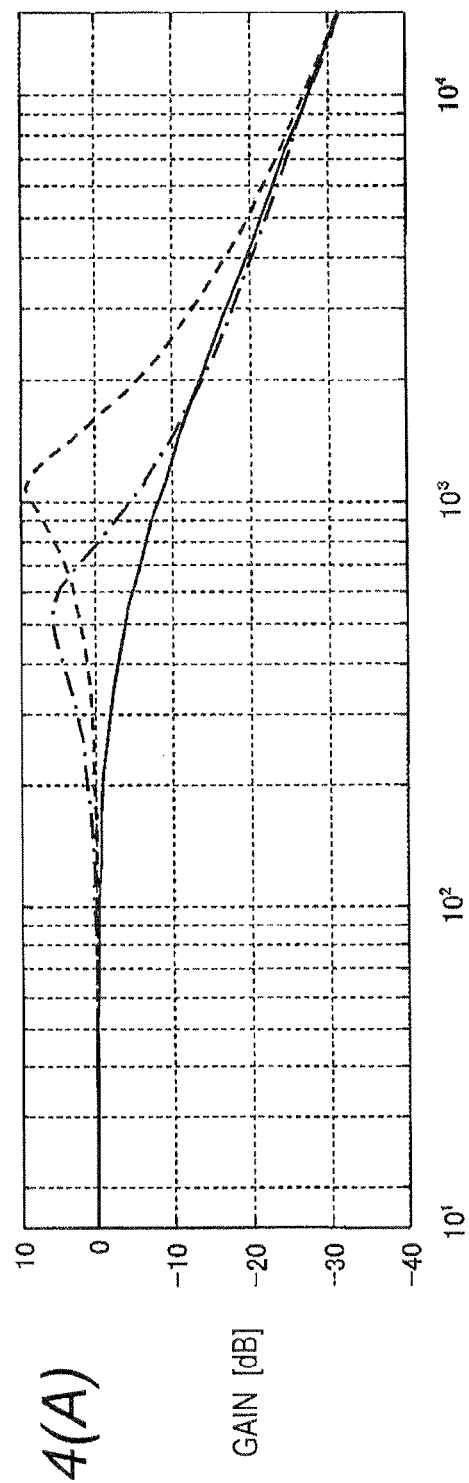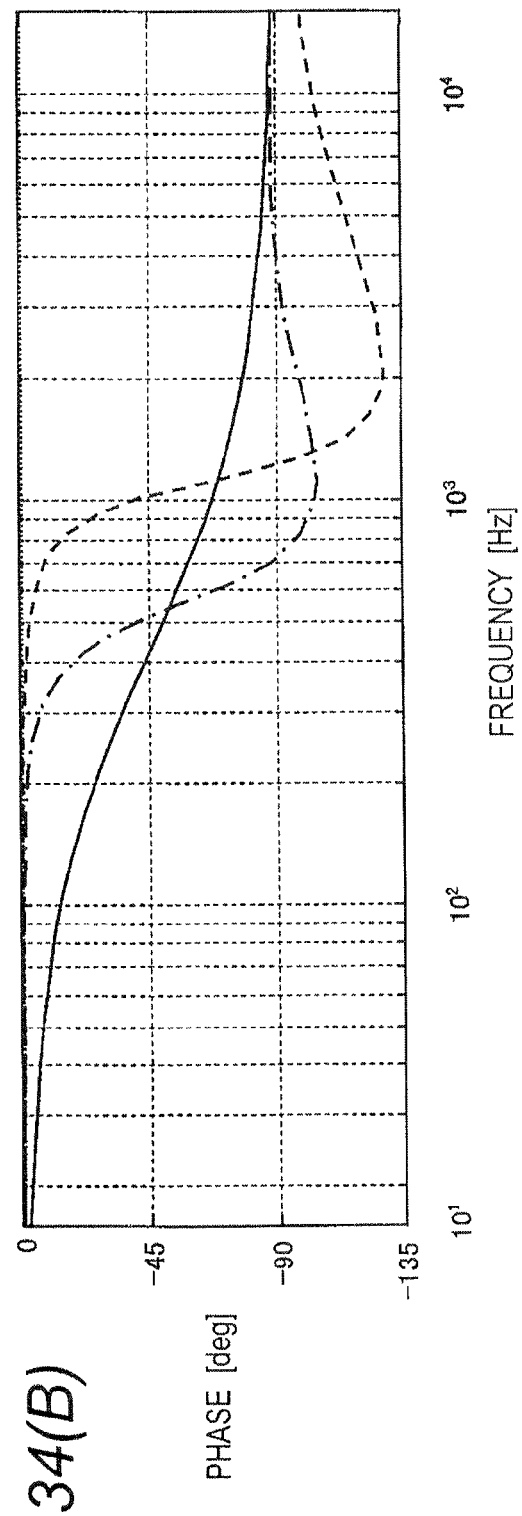
Fig.34(A)
Fig.34(B)

TIME [sec]

POWER CONVERTER

CROSS-REFERENCE TO RELATED APPLICATIONS

This U.S. National stage application claims priority under 35 U,S,C, §119(a) to Japanese Patent Application Nos. 2011-208788, filed in Japan on Sep. 26, 2011 and 2012-120205, filed in Japan on May. 25, 2012, the entire contents of which are hereby incorporated herein b y reference,

TECHNICAL FIELD

The present invention relates to a power converter.

BACKGROUND ART

As a typical main circuit construction for power converters, there has generally been used an indirect-type AC power converter in which commercial AC voltage is converted into DC voltage via a rectifier circuit and a smoothing circuit and then AC power is obtained by a voltage-type converter. Meanwhile, as a method for obtaining an AC output directly from AC voltage, there is known a three-phase capacitorless inverter which eliminates the need for large-scale capacitors or reactors for use of smoothing voltage pulsations due to commercial frequency so that downsizing of power converters becomes implementable.

As a conventional first power converter, there is provided a direct-type AC power conversion circuit in which sextuple-harmonic currents toward the power supply side are suppressed (see, e.g, JP 4488122 B).

As a conventional second power converter, there is provided one in which pulsating voltages are detected to modulate a voltage-type inverter so that voltage pulsations are compensated to obtain output voltages equivalent to those of conventional inverters (see, e.g., JP 61-48356 B).

In the above-shown conventional second power converter, when large harmonics of the motor slot are involved in the motor load, it is conceivable to increase the reactor capacity so that the resonance frequency of an LC filter is lowered to suppress power harmonics, in which case, however, features of the capacitorless method could not be utilized. As a result, with the conventional first power converter, in cases where harmonic components occur to high orders in the motor load, there arises a necessity for a plurality of control circuits and moreover, strictly, harmonic components cannot be erased without considering phase characteristics, which causes a problem of complicated control circuits.

SUMMARY

Technical Problem

Accordingly, an object of the present invention is to provide a power converter capable of suppressing harmonics due to an inductive load while suppressing resonance due to an LC filter and capable of fulfilling optimum control of good responsivity to the inductive load.

Solution to Problem

In order to solve the problem, a power converter according to the present invention comprises:

a rectifier section for rectifying a single-phase or polyphase AC voltage into a DC voltage;

an inverter section of PWM (Pulse Width Modulation) control for converting the DC voltage outputted from the rectifier section into an AC voltage and outputting the AC voltage;

a capacitance element connected between input ends of the inverter section;

an inductance element making up an LC (Induction-Capacitance) filter in combination with the capacitance element;

a voltage detector for detecting a voltage across the inductance element; and a controller for controlling the inverter section on a basis of a voltage across the inductance element detected by the voltage detector, wherein the LC filter has a resonance frequency set therein so as to pass therethrough ripple current components contained in the DC current outputted from the rectifier section and to damp current components of a frequency equal to a carrier frequency of the inverter section, and the controller controls the inverter section so that a transfer characteristic of input voltage of the inverter section versus the DC voltage from the rectifier section becomes a damping characteristic given by a phase lead element and a second-order lag element connected in series, and moreover a damping coefficient of the transfer characteristic of the input voltage of the inverter section versus the DC voltage from the rectifier section is set larger than 1.

With this constitution, the controller controls the inverter section so that the transfer characteristic of input voltage of the inverter section versus the DC voltage from the rectifier section becomes a damping characteristic given by the phase lead element and the second-order lag element connected in series, and moreover the damping coefficient of the transfer characteristic of the input voltage of the inverter section versus the DC voltage from the rectifier section is set larger than 1. Thus, harmonics due to the inductive load can be effectively suppressed while resonance due to the LC filter is suppressed, so that optimum control of good responsivity to the inductive load such as a motor can be fulfilled.

In one embodiment of the invention, the controller includes:

a first feedback loop for, in terms of transfer characteristics of the input voltage of the inverter section versus the DC voltage from the rectifier section, controlling a current flowing through the inductance element by negatively feeding back a voltage across the inductance element detected by the voltage detector to an input current of the inverter section, and a second feedback loop for controlling a current flowing through the capacitance element by positively feeding back the input voltage of the inverter section to an input current of the inverter section, and a gain $k_1$ of the first feedback loop and a gain $k_2$ of the second feedback loop are set so that a transfer characteristic of the input voltage of the inverter section versus the DC voltage from the rectifier section and a transfer characteristic of a DC current flowing through the inductance element versus the input current of the inverter section become predetermined transfer characteristics, respectively.

According to this embodiment, by the setting of the gain $k_1$ of the first feedback loop for controlling the current flowing through the inductance element by exerting negative feedback of the voltage across the inductance element to the input current of the inverter section, as well as by the setting of the gain $k_2$ of the second feedback loop for controlling the current flowing through the capacitance element by exerting positive feedback of the input voltage of the inverter section to the input current of the inverter section, it becomes implementable to set a cut-off frequency of the transfer characteristic of the input voltage of the inverter section versus the DC voltage derived from the rectifier section, as well as a cut-off frequency of the transfer characteristic of the DC current flowing through the inductance element versus the input current of the inverter section, independently of each other.

In one embodiment, in the controller, a gain $k_1$ of the first feedback loop and a gain $k_2$ of the second feedback loop are set so that a cut-off frequency of the transfer characteristic of the input voltage of the inverter section versus the DC voltage from the rectifier section and a lower-side cut-off frequency of the transfer characteristic of the DC current flowing through the inductance element versus the input current of the inverter section become equal to each other.

According to this embodiment, the cut-off frequency of the transfer characteristic of the input voltage of the inverter section versus the DC voltage derived from the rectifier section and the lower cut-off frequency of the transfer characteristic of the DC current flowing through the inductance element versus the input current of the inverter section are made coincident with each other by setting the gain $k_1$ of the first feedback loop and the gain $k_2$ of the second feedback loop. Thus, it becomes implementable to set a larger damping coefficient because of less influences of the sampling frequency (carrier frequency) of PWM control. Further, it also becomes possible to lower the inductance value of the inductance element, allowing the inductance element to be downsized.

In one embodiment, the controller includes, in terms of the transfer characteristic of the input voltage of the inverter section versus the DC voltage from the rectifier section, a ripple removal section for removing ripple voltage components contained in the DC voltage outputted from the rectifier section by rectifying the single-phase or polyphase AC voltage by the rectifier section in the second feedback loop of the input voltage of the inverter section.

According to this embodiment, ripple voltage components contained in the DC voltage outputted from the rectifier section are removed by the ripple removal section provided in the second feedback loop of the input voltage of the inverter section. Therefore, it becomes implementable to control harmonic components of the current flowing through the capacitance element by exerting positive feedback of high frequency components alone of the input voltage of the inverter section to the input current of the inverter section in the second feedback loop.

In one embodiment, in the controller, the gain $k_1$ of the first feedback loop of the voltage across the inductance element detected by the voltage detector is set approximately to zero.

According to this embodiment, even in the case where the gain $k_1$ of the first feedback loop of the voltage across the inductance element detected by the voltage detector is set approximately to zero, harmonics due to an inductive load can be effectively suppressed while resonance due to the LC filter is suppressed, by the setting of the cut-off frequency of the transfer characteristic of the input voltage of the inverter section versus the DC voltage derived from the rectifier section.

A power converter of one embodiment further comprises:

a resistor connected in parallel to both ends of the inductance element, wherein the gain $k_1$ of the first feedback loop of the voltage across the inductance element detected by the voltage detector is set by a resistance value of the resistor.

According to this embodiment, in the case where the gain $k_1$ of the first feedback loop of the voltage across the inductance element detected by the voltage detector is set by a resistance value of the resistor connected in parallel to both ends of the inductance element, there are less influences of the sampling frequency (carrier frequency) of the PWM control, so that the stability of the control is improved.

In one embodiment, the controller controls the inverter section so that a cut-off frequency of the transfer characteristic of the input voltage of the inverter section versus the DC voltage from the rectifier section becomes higher than a resonance frequency of the LC filter and moreover a cut-off frequency of a transfer characteristic of a DC current flowing through the inductance element versus the input current of the inverter section becomes lower than the resonance frequency of the LC filter.

According to this embodiment, it becomes implementable to raise the cut-off frequency of the resonance suppression system for suppressing resonance due to the LC filter in terms of the transfer characteristic of the input voltage of the inverter section versus the DC voltage from the rectifier section, and to lower the cut-off frequency of the harmonic suppression system for suppressing harmonics due to the inductive load in terms of the transfer characteristic of the DC current flowing through the inductance element versus the input current of the inverter section.

In one embodiment, given a capacitance C[F] of the capacitance element, an inductance L[H] of the inductance element, a standard capacitance $C_R$[F] of the capacitance element, and an inductance $L_R$[H] of the inductance element determined by the standard capacitance $C_R$ of the capacitance element and the resonance frequency of the LC filter, it is satisfied that $$L/C < L_R/C_R.$$

In this case, the term, standard capacitance of the capacitance element, refers to a capacitance value that should be determined so as to prevent breakdowns of circuit elements due to operation halt of the inverter section, while suppressing harmonics, based on an inductance of the inductive load such as a motor, power supply inductance, charging voltage of the capacitance element, power consumption of the motor load, frequency of ripple components of the DC link voltage, and motor exciting current. In addition, with combinational use of a CD clamp or other circuit for absorbing load induced power, the standard capacitance is determined by the permissible ripple current or temperature-increased value of the capacitance element.

According to this embodiment, the inductance element can be downsized while resonance due to the LC filter and harmonics due to the inductive load are suppressed.

In one embodiment, given a capacitance C[F] of the capacitance element, an inductance L[H] of the inductance element, a standard capacitance $C_R$[F] of the capacitance element, and an inductance $L_R$[H] of the inductance element determined by the standard capacitance $C_R$ of the capacitance element and the resonance frequency of the LC filter, it is satisfied that $$L/C > L_R/C_R.$$

According to this embodiment, higher-order harmonics of the inductive load can be suppressed while resonance due to the LC filter is suppressed.

In one embodiment, a cut-off frequency of a transfer characteristic of a DC current flowing through the inductance element versus input current of the inverter section is larger than a repetition frequency of ripple voltage components contained in the DC voltage outputted from the rectifier section by rectifying the single-phase or polyphase AC voltage by the rectifier section.

According to this embodiment, by the setting that the cut-off frequency that is a transfer characteristic of the DC current flowing through the inductance element versus input current of the inverter section is larger than the repetition frequency of ripple components contained in a DC voltage outputted from the rectifier section, it becomes possible to fulfill control suitable for the inverter section that performs control to compensate ripple voltage components contained in the DC voltage outputted from the rectifier section.

In one embodiment, a cut-off frequency of a transfer characteristic of a DC current flowing through the inductance element versus input current of the inverter section is smaller than a repetition frequency of ripple voltage components contained in the DC voltage outputted from the rectifier section by rectifying the single-phase or polyphase AC voltage by the rectifier section.

According to this embodiment, by the setting that the cut-off frequency that is a transfer characteristic of the DC current flowing through the inductance element versus input current of the inverter section is smaller than the repetition frequency of ripple voltage components contained in a DC voltage outputted from the rectifier section, it becomes possible to fulfill control suitable for the inverter section that performs constant current control.

In one embodiment, the inductance element is connected between one output end of the rectifier section and one input end of the inverter section.

According to this embodiment, since AC components of resonance current and harmonic current flow through the inductance element connected between one output end of the rectifier section and one input end of the inverter section, detecting a voltage across the inductance element by the voltage detector makes it possible to obtain a voltage signal suitable for control of resonance suppression and harmonic suppression of the inverter section.

In one embodiment, the inductance element is connected between one output end of an AC power supply for supplying the AC voltage and one input end of the rectifier section.

According to this embodiment, with the construction in which the single-phase AC voltage is inputted to the rectifier section, AC components of resonance current and harmonic current flow through the inductance element connected between one output end of an AC power supply for supplying AC voltage and one input end of the rectifier section. Therefore, by detecting a voltage across the inductance element by the voltage detector, a voltage signal suitable for control of the inverter section can be obtained. Also, with a construction in which polyphase AC voltage is inputted to the rectifier section, AC components of resonance current and harmonic current of each phase flow through the inductance element connected for each phase between one output end of an AC power supply for supplying AC voltage and one input end of the rectifier section. Therefore, by detecting voltages across the individual inductance elements by the voltage detectors, respectively, voltage signals suitable for control of resonance suppression and harmonic suppression of the inverter section can be obtained.

Advantageous Effects of Invention

As apparent from the above description, according to the power converter of this invention, there can be realized a power converter capable of suppressing harmonics due to the inductive load while suppressing resonance due to the LC filter and capable of fulfilling optimum control of good responsivity to the inductive load.

BRIEF DESCRIPTION OF DRAWINGS

FIG. 4 is a view showing a transfer function of the power converter;

FIGS. 12(A) and 12(B) are Bode diagrams showing characteristics of the harmonic suppression system in the power converter;

FIGS. 21(A) and 21(B) are Bode diagrams showing characteristics of the resonance suppression system in the power converter of the first embodiment;

FIGS. 28(A) and 28(B) are Bode diagrams for explaining gain margin of the power converter of the second embodiment;

FIGS. 34(A) and 34(B) are Bode diagrams with a DC-cutting high-pass filter and a ripple removal section applied to the power converter;

DESCRIPTION OF EMBODIMENTS

Hereinbelow, the power converter of the present invention will be described in detail by embodiments thereof illustrated in the accompanying drawings.

(First Embodiment)

Figure 1:
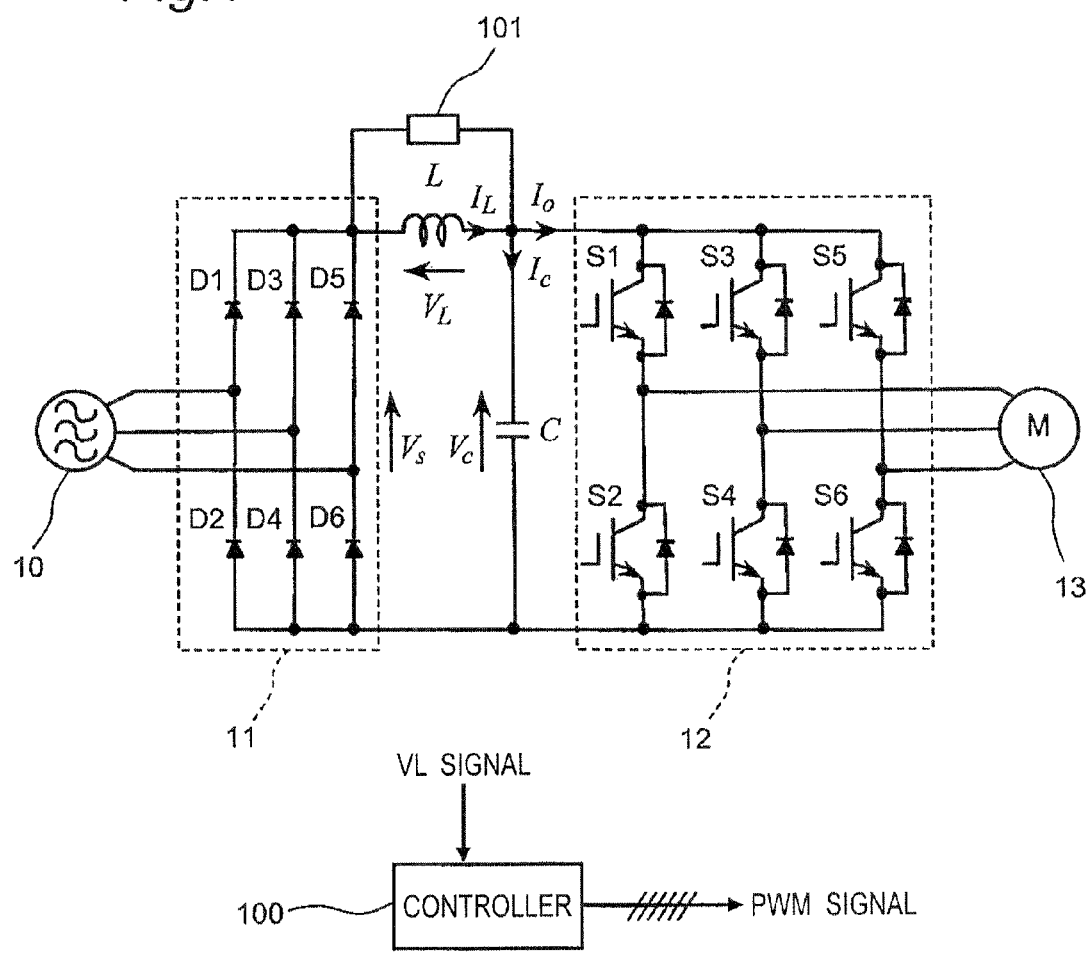
FIG. 1 is a constructional view of a power converter according to a first embodiment of the present invention.

FIG. 1 shows a constructional view of a power converter according to a first embodiment of the invention. This power converter, as shown in FIG. 1, includes a diode bridge 11 as an example of a rectifier section composed of six diodes D1-D6 composing a three-phase diode bridge circuit, and an inverter section 12 composed of six switching elements S1-S6 composing a three-phase bridge circuit. The power converter also includes a reactor L as an example of an inductance element connected between a positive-pole side output end of the diode bridge 11 and a positive-pole side input end of the inverter section 12, and a capacitor C as an example of a capacitance element connected between input ends of the inverter section 12. The reactor L and the capacitor C constitute an LC filter. The power converter further includes a voltage detector 101 for detecting a voltage across the reactor L, and a controller 100 for outputting a PWM signal to each of the switching elements S1-S6 of the inverter section 12 based on a $V_L$ signal representing a voltage across the reactor L derived from the voltage detecting section 101.

A three-phase AC voltage from a three-phase AC power supply 10 is rectified to a direct current by the diode bridge 11, and a rectified DC voltage is converted into a specified three-phase AC voltage by the inverter section 12, thus being outputted as it is. In this first embodiment, a motor 13 is connected as a load of the inverter section 12.

The capacitance of the capacitor C of the LC filter in the DC link section of the power converter shown in FIG. 1 is as small as a few percent or less of conventional ones. Moreover, the resonance frequency of the LC filter is set to around a few kHz, which is one or more-order higher than conventional ones, so as to damp the carrier current component of the inverter unit, while the inductance of the reactor L is also set to a small value.

Therefore, neither the reactor L nor the capacitor C of the DC link section has the function of smoothing commercial frequency components, so that a potential of the maximum phase on the basis of the minimum phase of phase voltage occurs to the DC link section and pulsatees at a sextuple frequency of the commercial frequency. Similarly, for the input current as well, since DC current passes between the maximum phase and the minimum phase, a 120° current-passing waveform results on condition that the input current of the inverter section is constant.

Figure 2:
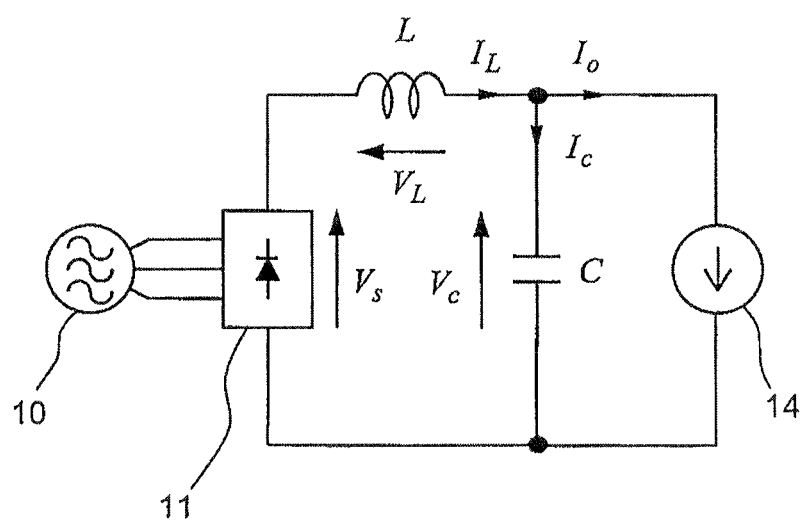
FIG. 2 is a view showing an equivalent circuit of the power converter.

FIG. 2 shows an equivalent circuit of the power converter. In FIG. 2, reference sign 14 denotes a current source simply representing the inverter section with a load connected thereto, $V_s$ denotes a DC voltage outputted from the diode bridge 11, $V_c$ denotes a voltage across the capacitor C, $I_L$ denotes a current flowing through the reactor L, $I_c$ denotes a current flowing through the capacitor C, and $I_0$ denotes a current flowing through the DC link section.

Figure 3A:
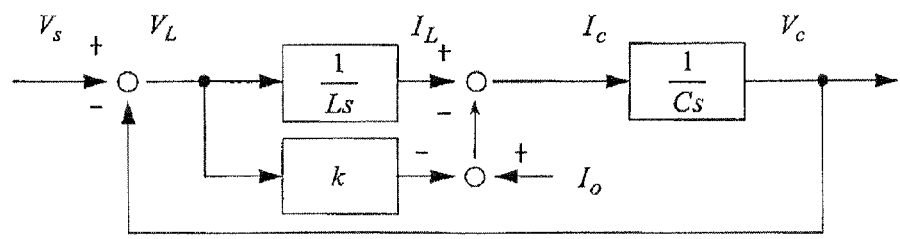
FIGS. 3(A), 3(B) and 3(C) are block diagrams of the power converter.
Figure 3B:
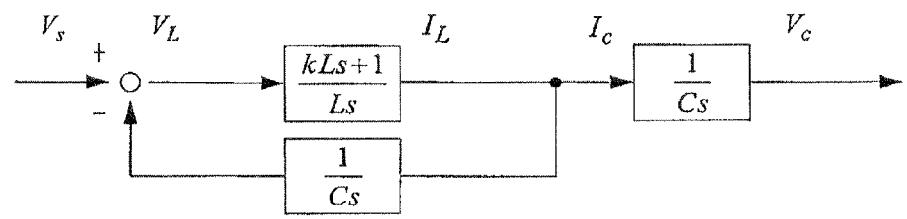
Figure 3C:
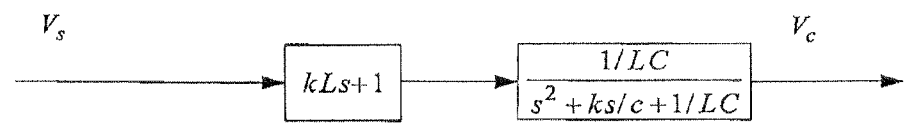

FIGS. 3(A)-3(C), which are block diagrams resulting from determining characteristics of the resonance suppression system with the voltage $V_L$ across the reactor L used for resonance suppression, show transfer characteristics of the voltage $V_c$ across the capacitor C (i.e., input voltage of the inverter section 12) versus the DC voltage $V_s$ outputted from the diode bridge 11.

It can be seen that executing equivalent transformation in the order of FIG. 3(A)-FIG. 3(C) finally results in a series system composed of a second-order system and a phase lead shown in FIG. 3(C). Thus, the controller 100 controls the inverter section 12 so as to meet a damping characteristic that the phase lead element and the second-order lag element shown in FIG. 3(C) are connected in series.

In FIG. 4, which shows a transfer function G(s) of the block diagram of FIG. 3, the second term represents a second-order system, allowing the damping characteristic to be improved by gain k, and the first term corresponds to a phase lead, so that a characteristic close to a stable first-order lag system can be obtained by the above two terms. In FIG. 4, reference sign $V_s$ denotes a DC voltage outputted from the diode bridge 11, $V_c$ denotes a voltage across the capacitor C, L denotes an inductance of the reactor L, C denotes a capacitance of the capacitor C, and denotes a Laplace variable.

Figure 5:
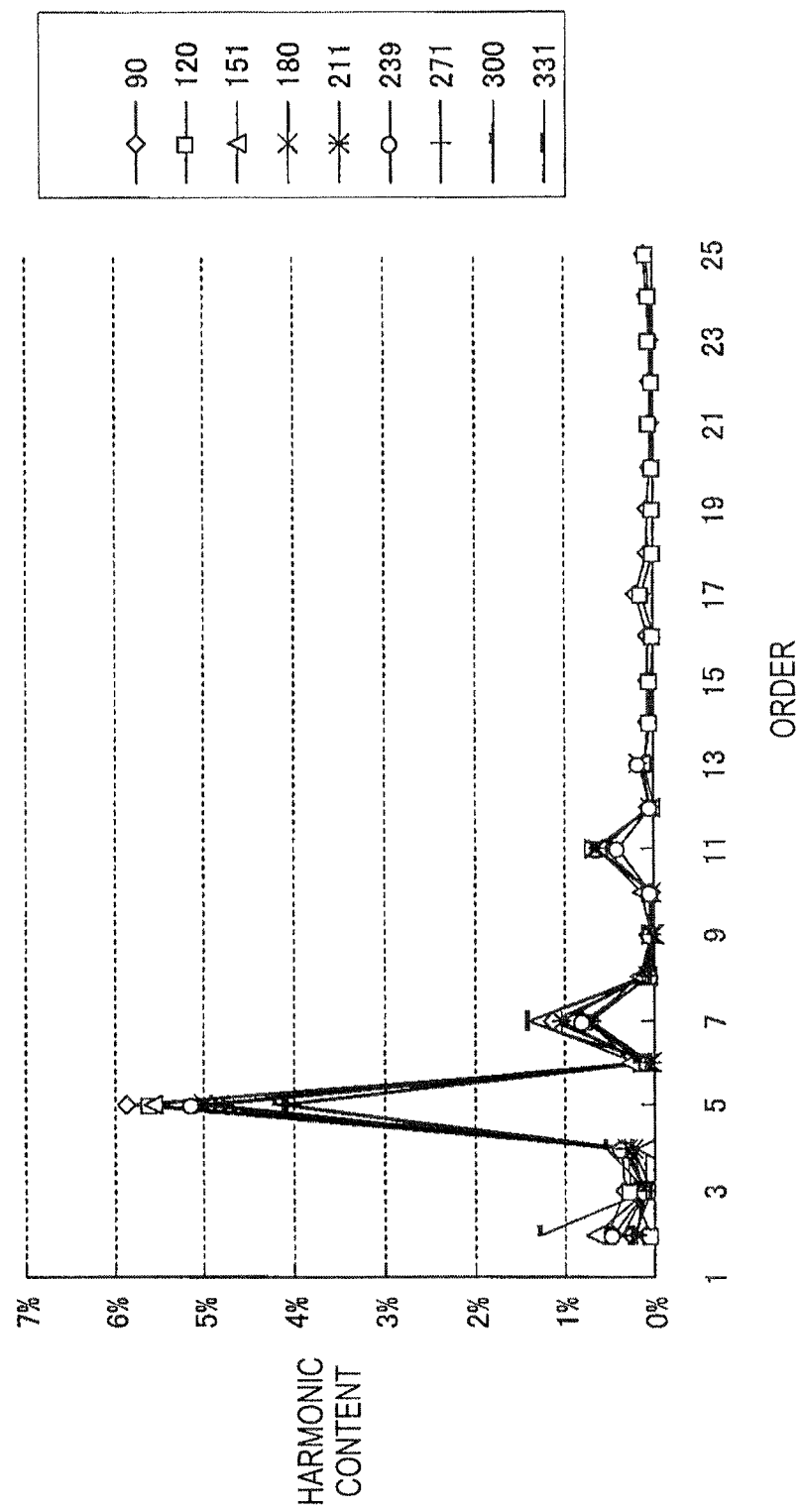
FIG. 5 is a view showing an example of harmonic currents of a concentrated-winding hexapole motor.

Next, FIG. 5 shows an example of harmonic currents of a concentrated-winding hexapole motor. In FIG. 5, the horizontal axis represents the order of harmonics while the vertical axis represents the content of harmonic currents. It is noted that in FIG. 5, the content of harmonic currents is shown in steps of frequencies (Hz) of the AC power supply for driving the concentrated-winding hexapole motor, i.e., in steps of 90 Hz, 120 Hz, 151 Hz, 180 Hz, 211 Hz, 239 Hz, 271 Hz, 300 Hz and 331 Hz.

Also, Equations (1)-(8) as shown below represent relationships between harmonic currents and effective power due to the concentrated-winding motor, where it is shown that both fifth- and seventh-order components incur sextuple power pulsations. This result means that in the power converter shown in FIG. 1, sextuple harmonic currents occur to the DC link current.

(5th-order harmonic)

$$\left. \begin{array}{l} e_{La} = \sqrt{2}\, E_{La} \cos \omega_L t \\ e_{Lb} = \sqrt{2}\, E_{Lb} (\cos \omega_L t - 2\pi/3) \\ e_{Lc} = \sqrt{2}\, E_{Lc} (\cos \omega_L t + 2\pi/3) \end{array} \right\} \quad (1)$$

$$\left. \begin{array}{l} i_{La} = \sqrt{2}\, I_{La} \cos 5\omega_L t \\ i_{Lb} = \sqrt{2}\, I_{Lb} \cos 5(\omega_L t - 2\pi/3) \\ i_{Lc} = \sqrt{2}\, I_{Lc} \cos 5(\omega_L t + 2\pi/3) \end{array} \right\} \quad (2)$$

$$\left. \begin{array}{l} P_{La} = E_{La}I_{La}\cos 6\omega_L t + E_{La}I_{La}\cos 4\omega_L t \\ P_{Lb} = E_{Lb}I_{Lb}\cos 6(\omega_L t - 2\pi/3) + E_{La}I_{La}\cos 4(\omega_L t - 2\pi/3) \\ P_{La} = E_{Lc}I_{Lc}\cos 6(\omega_L t + 2\pi/3) + E_{La}I_{La}\cos 4(\omega_L t + 2\pi/3) \end{array} \right\} \quad (3)$$

$$\begin{array}{l} P_L = 3E_L I_L \cos 6\omega_L t + E_{La}I_{La}\cos 4\omega_L t + \\ \quad E_{Lb}I_{Lb}\cos 4(\omega_L t - 2\pi/3) + E_{Lc}I_{Lc}\cos 4(\omega_L t + 2\pi/3) \\ = 3E_L I_L \cos 6\omega_L t \end{array} \quad (4)$$

(7th-order harmonic)

$$\left. \begin{array}{l} e_{La} = \sqrt{2}\, E_{La} \cos \omega_L t \\ e_{Lb} = \sqrt{2}\, E_{Lb} (\cos \omega_L t - 2\pi/3) \\ e_{Lc} = \sqrt{2}\, E_{Lc} (\cos \omega_L t + 2\pi/3) \end{array} \right\} \quad (5)$$

$$\left. \begin{array}{l} i_{La} = \sqrt{2}\, I_{La} \cos 7\omega_L t \\ i_{Lb} = \sqrt{2}\, I_{Lb} \cos 7(\omega_L t - 2\pi/3) \\ i_{Lc} = \sqrt{2}\, I_{Lc} \cos 7(\omega_L t + 2\pi/3) \end{array} \right\} \quad (6)$$

$$\left. \begin{array}{l} P_{La} = E_{La}I_{La}\cos 6\omega_L t + E_{La}I_{La}\cos 8\omega_L t \\ P_{Lb} = E_{Lb}I_{Lb}\cos 6(\omega_L t - 2\pi/3) + E_{La}I_{La}\cos 8(\omega_L t - 2\pi/3) \\ P_{La} = E_{Lc}I_{La}\cos 6(\omega_L t + 2\pi/3) + E_{La}I_{La}\cos 8(\omega_L t + 2\pi/3) \end{array} \right\} \quad (7)$$

$$\begin{array}{l} P_L = 3E_L I_L \cos 6\omega_L t + E_{La}I_{La}\cos 8\omega_L t + \\ \quad E_{Lb}I_{Lb}\cos 8(\omega_L t - 2\pi/3) + E_{Lc}I_{Lc}\cos 8(\omega_L t + 2\pi/3) \\ = 3E_L I_L \cos 6\omega_L t \end{array} \quad (8)$$

where $E_{L\,a}$, $E_{L\,b}$, $E_{L\,c}$ are motor voltage effective values,
$e_{L\,a}$, $e_{L\,b}$, $e_{L\,c}$ are motor voltage instantaneous values,
$I_{L\,a}$, $I_{L\,b}$, $I_{L\,c}$ are motor current effective values,
$i_{L\,a}$, $i_{L\,b}$, $i_{L\,c}$ are motor current instantaneous values,
$P_{L\,a}$, $P_{L\,b}$, $P_{L\,c}$ are motor instantaneous effective power harmonic components,
$\omega_L$ is a motor drive angular frequency,
$E_L$ is a motor voltage effective value (in a three-phase equilibrium),
$I_L$ is a motor current effective value (in a three-phase equilibrium), and
$P_L$ is an instantaneous-effective-power harmonic component (equivalent to three-phase-portion, DC-section instantaneous power), Next, below described are the cut-off frequency of the resonance suppression system for suppression of resonance due to the LC filter, as well as the cut-off frequency of the harmonic suppression system for suppression of harmonics due to an inductive load such as the motor, in the control system whose input is a DC voltage derived from the diode bridge 11 and whose output is an AC voltage outputted from the inverter section 12.

(Cut-off frequency of resonance suppression system)

First, in the resonance suppression system shown in FIG. 3, the transfer function G(s) as to the voltage $V_c$ across the capacitor C versus the DC voltage $V_s$ outputted from the diode bridge 11 is expressed by $$G(s) = \frac{V_c}{V_s} = (kLs + 1)\frac{1/LC}{s^2 + ks/C + 1/LC} \quad (9)$$

Assuming that $$\zeta = \frac{k}{2}\sqrt{\frac{C}{L}},\ \omega = \frac{1}{\sqrt{LC}}$$

then Equation (9) can be transformed and expressed by the following Equation (10)

$$G(s) = = \frac{2\zeta\sqrt{LC}\,s + 1}{\left(\zeta + \sqrt{\zeta^2 - 1}\right)\sqrt{LC}\,s + 1}\,\frac{1}{\left(\zeta - \sqrt{\zeta^2 - 1}\right)\sqrt{LC}\,s + 1} \quad (10)$$

In this case, with a large damping coefficient ζ, the first term in Equation (10) can be considered to have a gain of 1, and the cut-off frequency $f_c$ determined by the second term of Equation (10) results in $$f_c = \frac{1}{\zeta - \sqrt{\zeta^2 - 1}\,\sqrt{LC}}\,\frac{1}{2\pi} \quad (11)$$

Thus, with the damping coefficient ζ larger than 1, the first term of Equation (10) can be regarded as being linear, and the frequency band (cut-off frequency $f_c$) of the resonance suppression system depends on the second term, having the relationship of Equation (11). Therefore, setting the damping coefficient $\zeta$ larger causes the time constant to become smaller and the cut-off frequency $f_c$ to become higher, with the band becoming wider, so that the frequency band over which the input/output voltage can be made linear can be widened.

(Cut-off frequency of harmonic suppression system)

Figure 6:
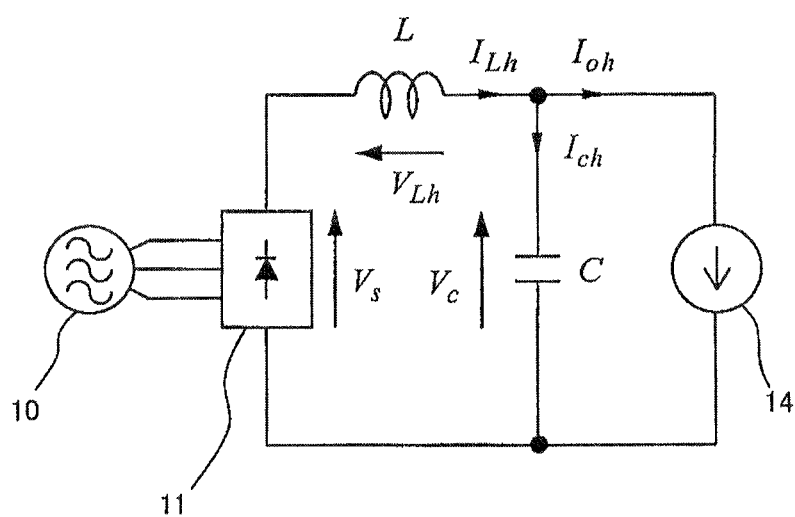
FIG. 6 is a view showing an equivalent circuit of the power converter.
Figure 7A:
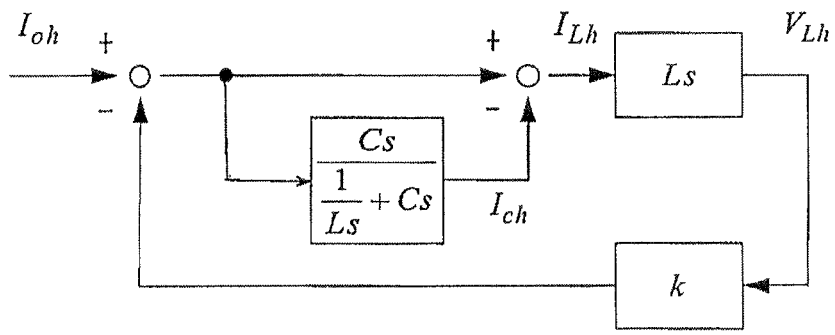
FIGS. 7(A), 7(B) and 7(C) are block diagrams showing transfer characteristics of a reactor current to a DC link current of the power converter.
Figure 7B:
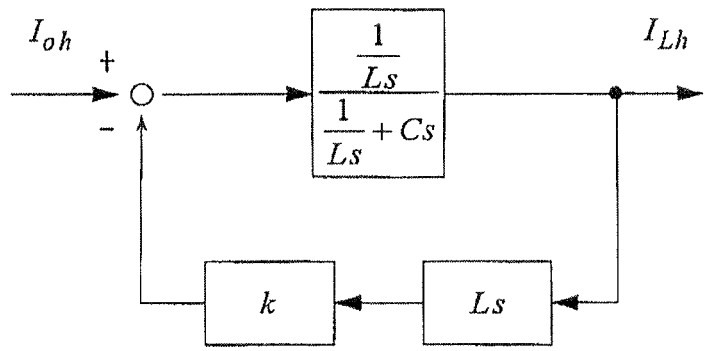
Figure 7C:
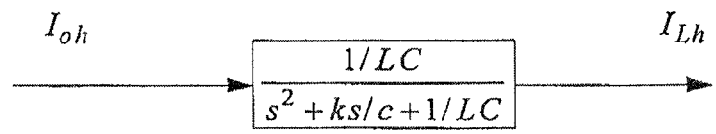

FIG. 6 shows an equivalent circuit of the power converter. FIGS. 7(A), 7(B) and 7(C) show transfer characteristics of the reactor current $i_{L\ h}$ (power input) versus the DC link current $i_{o\ h}$ shown in FIG. 6, which are determined in the control system of the power converter shown in FIG. 1. It can be seen that executing equivalent transformation shown in FIG. 7(A)-FIG. 7(C) leads to a result that the transfer function becomes a second-order system.

Meanwhile, assuming that the second-order system of the transfer function G(s) in FIG. 7(C) in this case is a series connection of the first-order lag system, and assuming that $$\zeta = \frac{k}{2}\sqrt{\frac{C}{L}}, \omega = \frac{1}{\sqrt{LC}}$$

then the transfer function G(s) comes to have a relationship shown by the following Equation (12), and this equation can be transformed into the following Equation (13):

$$G(s) = \frac{\omega^2}{s^2 + 2\zeta\omega s + \omega^2} \quad (12)$$

$$= \frac{1}{\frac{1}{\omega^2}s^2 + \frac{2\zeta}{\omega}s + 1}$$

$$= \frac{1}{\frac{\zeta + \sqrt{\zeta^2 - 1}}{\omega}s + 1} \cdot \frac{1}{\frac{\zeta - \sqrt{\zeta^2 - 1}}{\omega}s + 1} \quad (13)$$

In this case, the transfer function G(s) has a real root under the condition that damping coefficient $\zeta \geq 1$. With a large value of $\zeta$, the cut-off frequency $f_c$ of the transfer function of the reactor current $i_{L\ h}$ (power input) versus the DC link current $i_{o\ h}$ results in $$f_c = \frac{\omega}{\zeta + \sqrt{\zeta^2 - 1}} \cdot \frac{1}{2\pi} \quad (14)$$

Thus, with the damping coefficient $\zeta$ larger than 1, the transfer function, having a real root, can be considered as a series connection of the first-order lag system, and a large damping coefficient $\zeta$ causes the time constant of the first term of Equation (13) to become larger and the time constant of the second term of Equation (13) to become smaller. Thus, the frequency band (cut-off frequency $f_c$) of the harmonic suppression system depends on the first term and is expressed by Equation (14). Therefore, setting the damping coefficient $\zeta$ larger causes the time constant to become larger and the cut-off frequency $f_c$ to become lower, with the band becoming narrower, so that the frequency band for damping can be widened, conversely.

Figure 8:
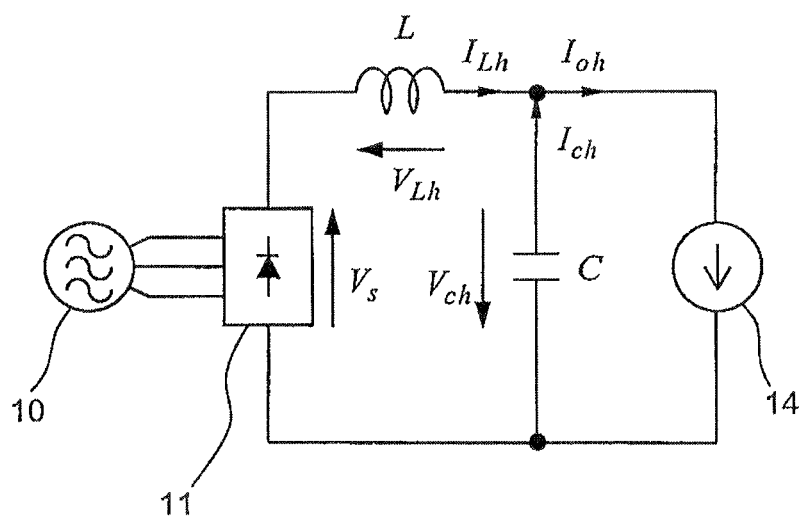
FIG. 8 is a view showing an equivalent circuit of the power converter.

FIG. 8 shows an equivalent circuit of the power converter. FIG. 9(A)-9(F) show block diagrams of the power converter. Flows of currents including a harmonic current occurring due to a motor load are shown in FIG. 8. In FIG. 8, reference sign $V_s$ denotes a DC voltage outputted from the diode bridge 11, $V_{L\ h}$ denotes a voltage across the reactor L, $V_{c\ h}$ denotes a voltage across the capacitor C, $I_{L\ h}$ denotes a reactor current flowing through the reactor L, $I_{c\ h}$ denotes a current flowing through the capacitor C, and $I_{o\ h}$ denotes a DC link current flowing through the DC link section.

As shown in FIG. 8, because of shunt of the harmonic current in the equivalent circuit shown in FIG. 2, polarities of $I_{c\ h}$ and $V_{c\ h}$ are inverted as compared with $I_c$ and $V_c$ shown in FIG. 2.

Figure 9A:
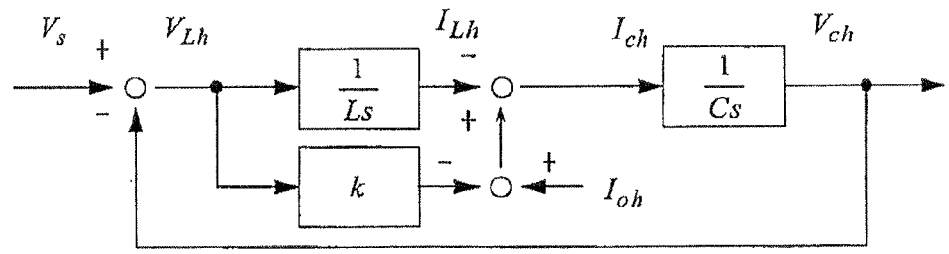
FIGS. 9(A), 9(B), 9(C), 9(D), 9(E) and 9(F) are block diagrams of the power converter.

Then, as in the case of FIG. 3(A), a transfer characteristic of the voltage $V_c$ across the capacitor C versus the DC voltage $V_s$ outputted from the diode bridge 11 is shown in FIG. 9(A).

Figure 9B:
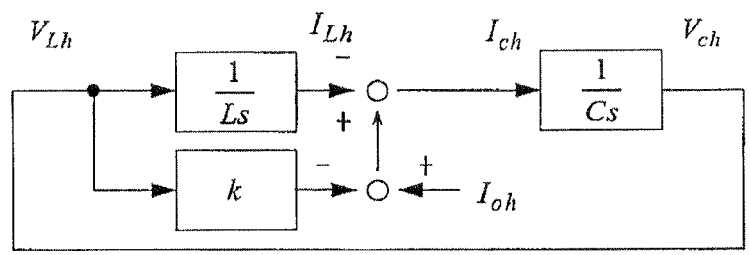

Next, with harmonic currents alone taken into account, it can be considered that $V_{L\ h}=V_{c\ h}$. Therefore, transformation as shown in FIG. 9(B) is performed.

Figure 9C:
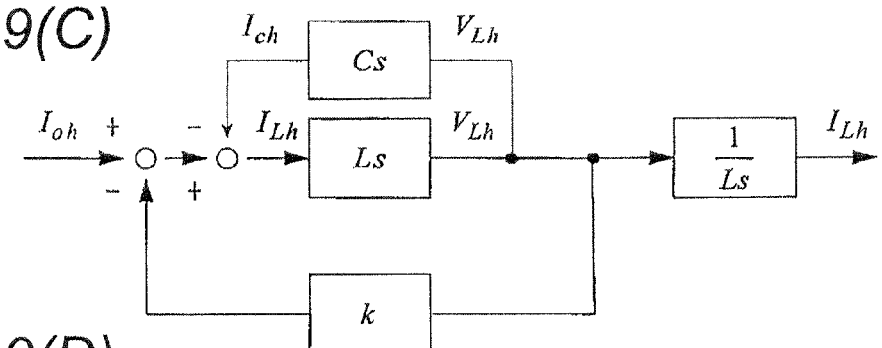
Figure 9D:
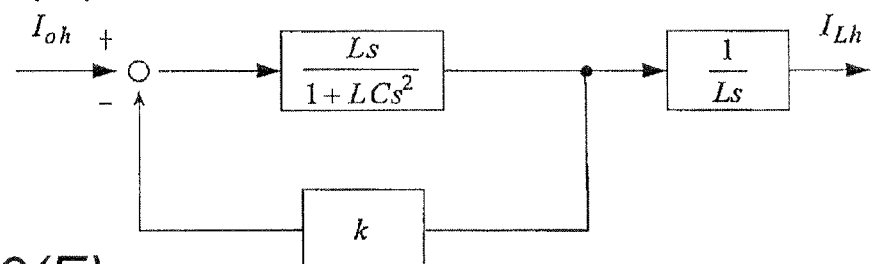
Figure 9E:
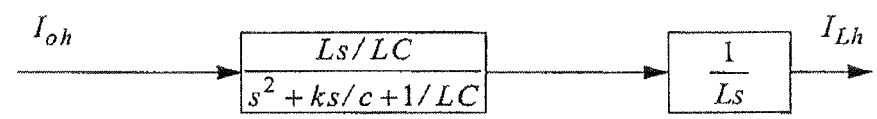
Figure 9F:
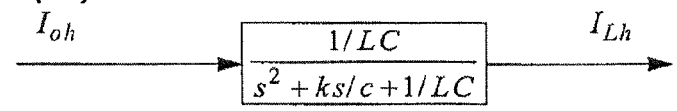

Next, as shown in FIG. 9(C), transformation to a transfer characteristic of the reactor current $i_{L\ h}$ versus the DC link current $i_{o\ h}$ is applied, followed by equivalent transformation shown in FIG. 9(D)-FIG. 9(F). As a result, a transfer characteristic shown in FIG. 9(F) results in the same transfer characteristic as shown in FIG. 7(C).

Figure 10:
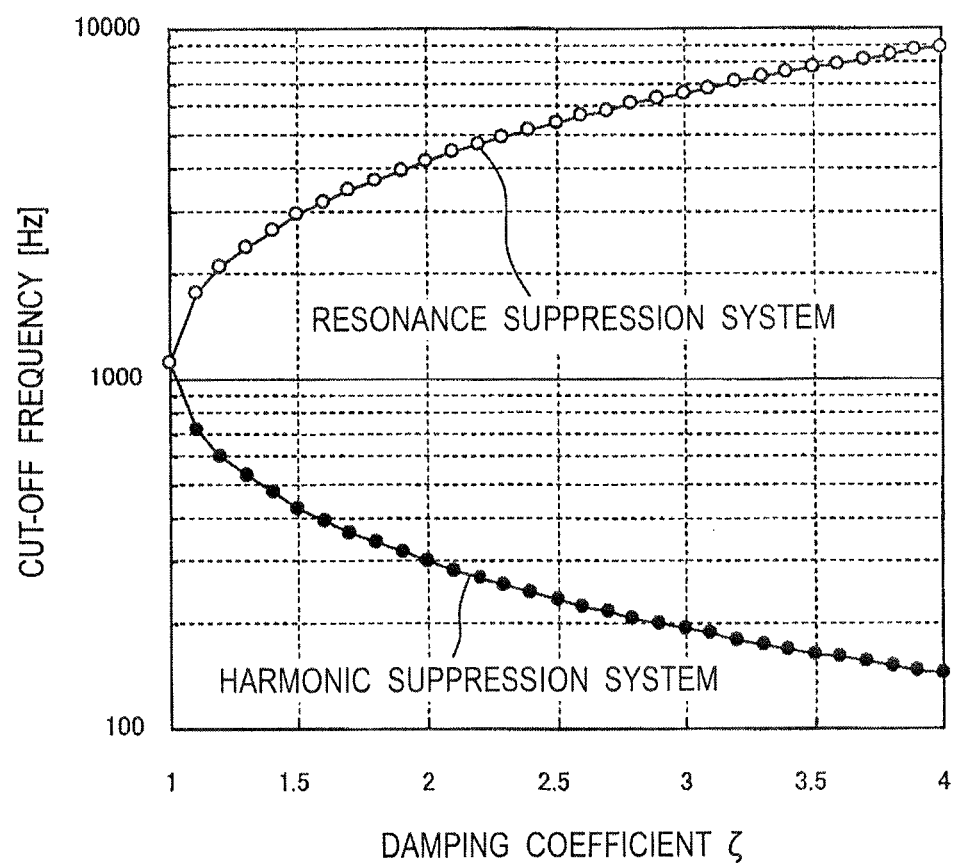
FIG. 10 is a chart showing a cut-off frequency versus damping coefficient characteristic of the resonance suppression system as well as a cut-off frequency versus damping coefficient characteristic of the harmonic suppression system in the power converter.

FIG. 10 shows a cut-off frequency versus damping coefficient $\zeta$ characteristic of the resonance suppression system as well as a cut-off frequency versus damping coefficient $\zeta$ characteristic of the harmonic suppression system in the power converter. In FIG. 10, the horizontal axis represents damping coefficient while the vertical axis represents cut-off frequency [Hz], where 'o' mark denotes cut-off frequency characteristics of the resonance suppression system and '●' mark denotes cut-off frequency characteristics of the harmonic suppression system.

As shown in FIG. 10, the more the damping coefficient $\zeta$ is set larger than 1, the higher the cut-off frequency of the resonance suppression system depending on the LC filter becomes and the lower the cut-off frequency of the harmonic suppression system becomes.

FIG. 10 shows results of determining cut-off frequencies versus the damping coefficient $\zeta$ on each of the harmonic suppression system and the resonance suppression system with the resonance frequency of the LC filter set to 1125 Hz. In power converters of the conventional method in which the damping coefficient $\zeta<1$, on the account that $\zeta=0.2-0.4$ (fixed value control), the frequency band is restricted to resonance frequencies of the LC filter. On the other hand, in the power converter of this invention, setting the damping coefficient $\zeta$ larger than 1 makes it possible to set a characteristic difference between the harmonic suppression system and the resonance suppression system.

Figure 11A:
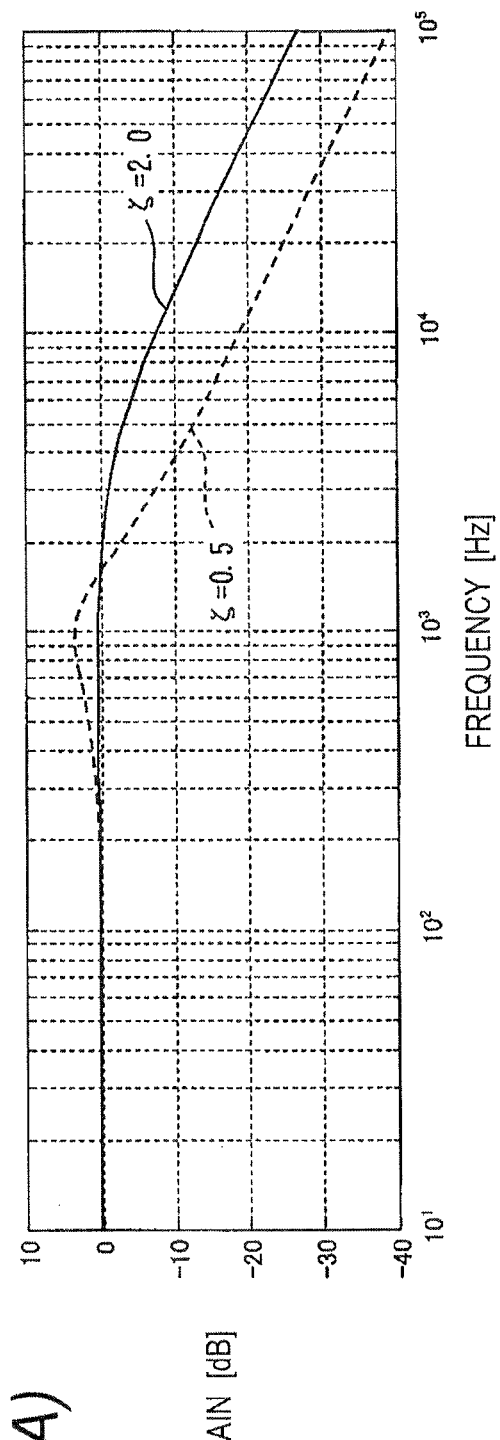
FIGS. 11(A) and 11(B) are Bode diagrams showing characteristics of the resonance suppression system in the power converter.
Figure 11B:
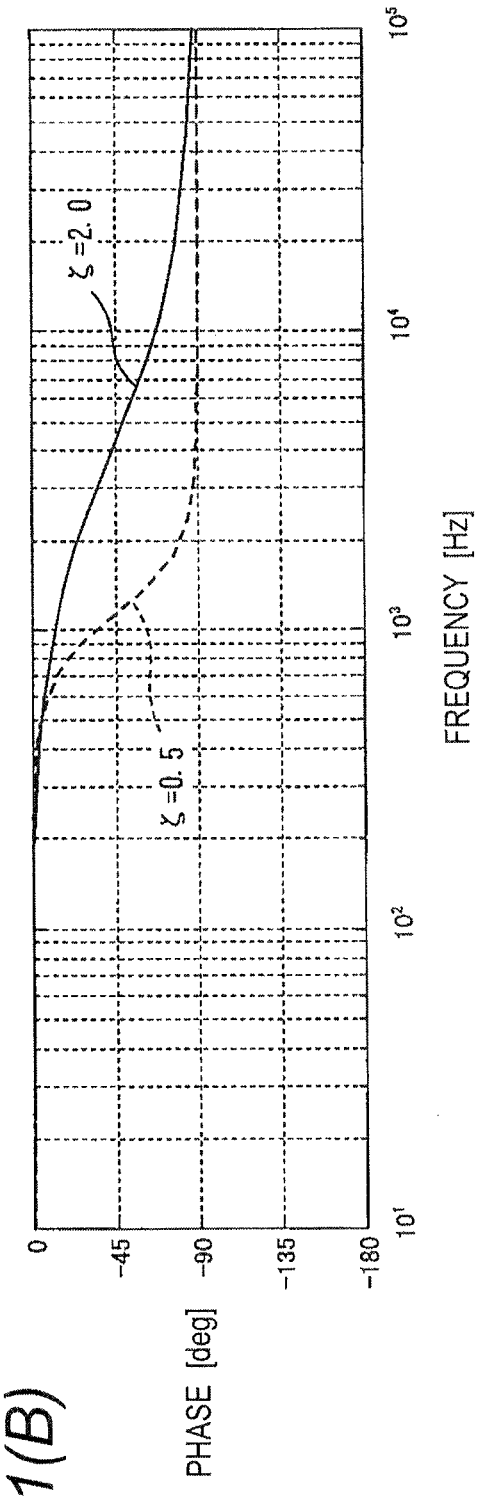

FIGS. 11(A) and 11(B) show characteristics of the resonance suppression system by the LC filter in the power converter, where FIG. 11(A) charts the gain characteristic and FIG. 11(8) charts the phase characteristics. In FIG. 11(A), the horizontal axis represents frequency [Hz] while the vertical axis represents gain [dB]. In FIG. 11(B), the horizontal axis represents frequency [Hz] while the vertical axis represents phase [deg].

Also in FIGS. 11(A) and 11(B), the solid line represents a characteristic under the condition that damping characteristic $\zeta=2.0$ while the broken line represents a characteristic under the condition that damping characteristic $\zeta=0.5$ where the cut-off frequency under the condition that damping coefficient $\zeta=2.0$ is 4200 Hz.

FIGS. 12(A) and 12(B) show characteristics of the harmonic suppression system in the power converter. FIG. 12(A) charts gain characteristics, and the FIG. 12(B) charts phase characteristics. In FIG. 12(A), the horizontal axis represents frequency [Hz] while the vertical axis represents gain [dB]. In FIG. 12(B), the horizontal axis represents frequency [Hz] while the vertical axis represents phase [deg].

Also in FIGS. 12(A) and 12(B), the solid line represents a characteristic with damping characteristic ζ=2.0 while the broken line represents a characteristic with damping characteristic ζ=0.5, where the cut-off frequency with damping characteristic ζ=2.0 is 302 Hz.

Figure 13:
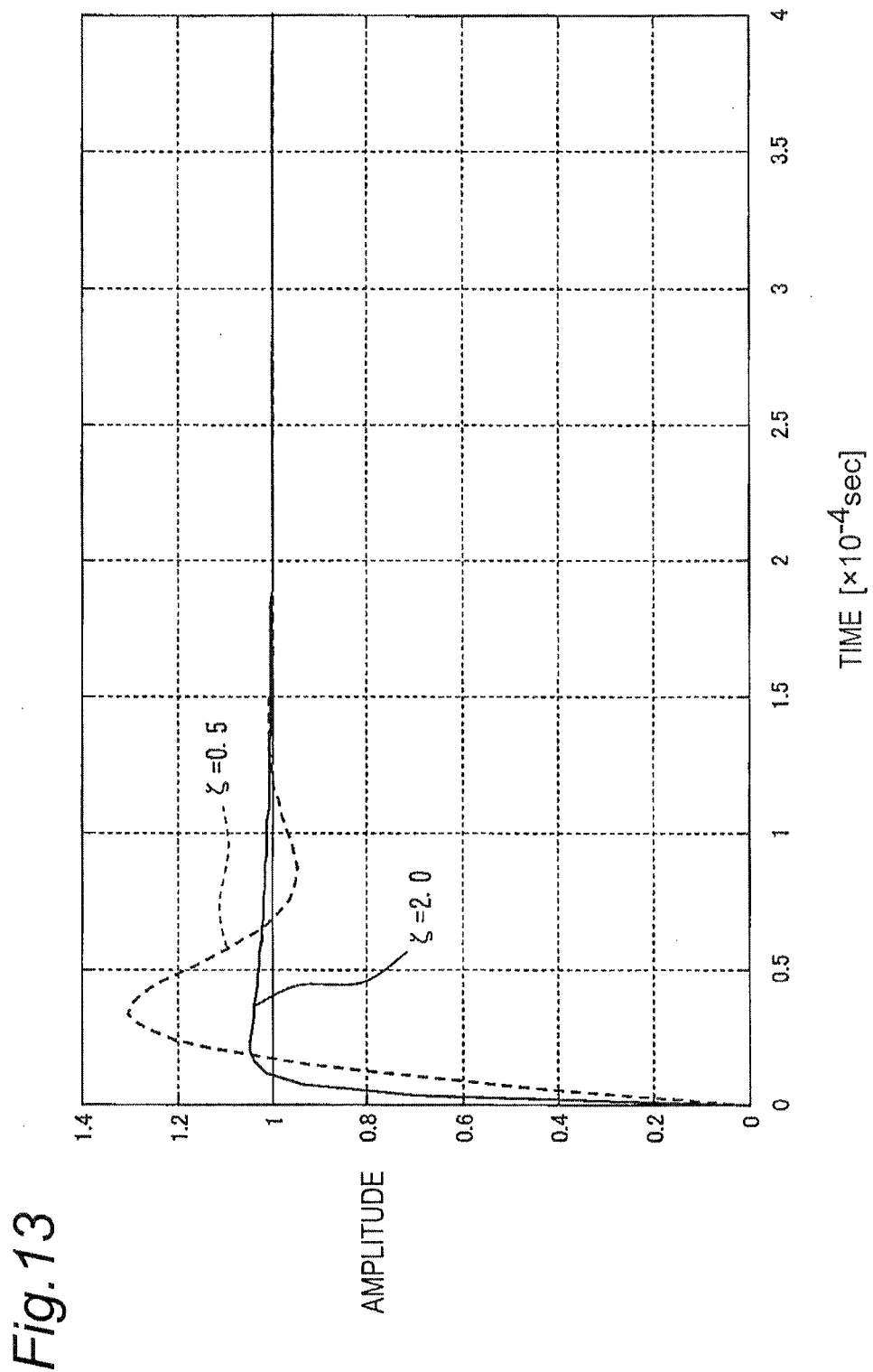
FIG. 13 is a view showing a step response characteristic of the resonance suppression system in the power converter.
Figure 14:
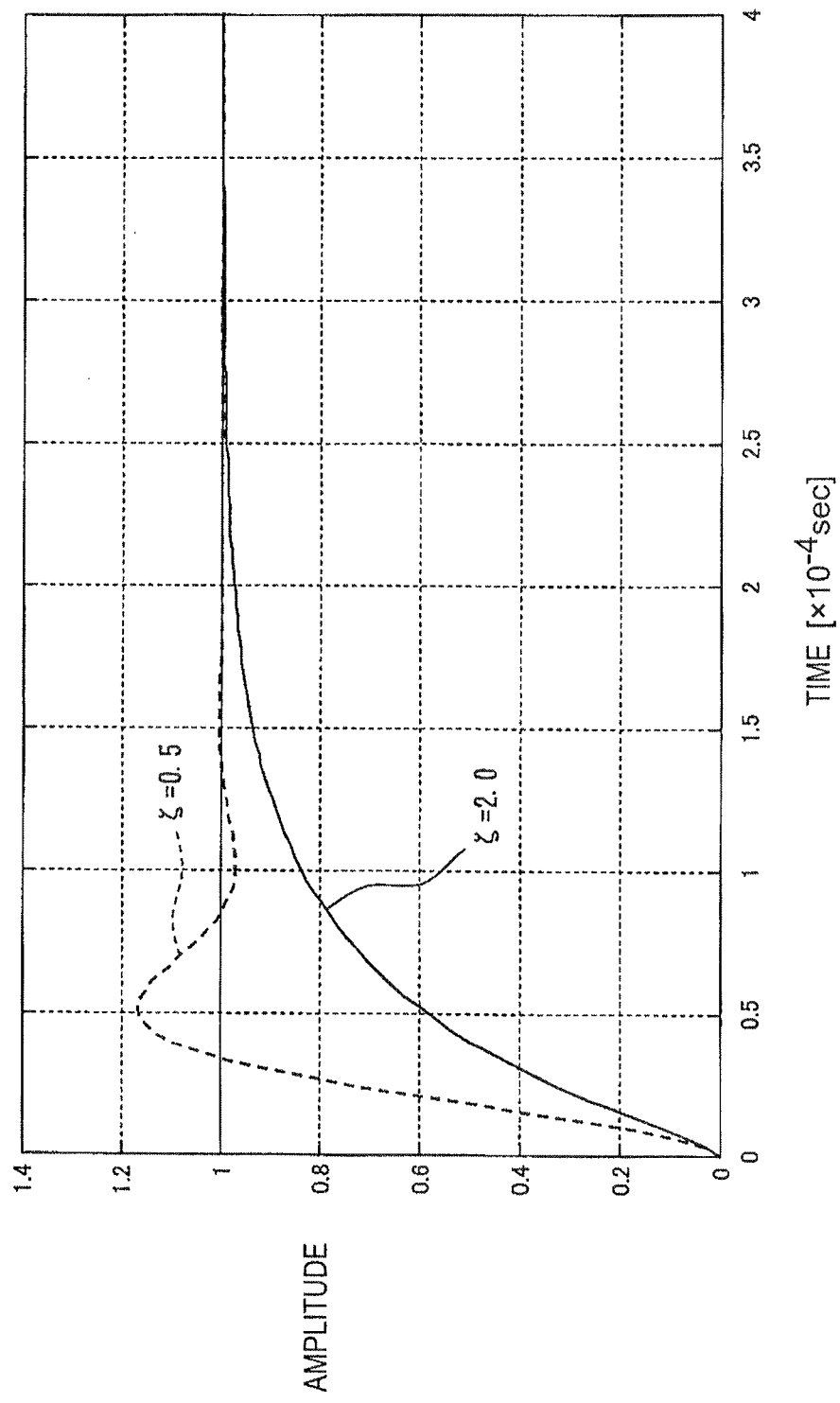
FIG. 14 is a view showing a step response characteristic of the harmonic suppression system of the motor in the power converter.

FIG. 13 shows a step response characteristic of the resonance suppression system for suppressing resonance due to the LC filter in the power converter. FIG. 14 shows a step response characteristic of the harmonic suppression system for suppressing harmonics of the motor in the power converter.

In FIGS. 13 and 14, the horizontal axis represents time ($\times 10^{-4}$ sec) while the vertical axis represents amplitude (arbitrary scale). Also in FIGS. 13 and 14, the solid line represents a step response characteristic with damping characteristic ζ=2.0 while the broken line represents a step response characteristic with damping characteristic ζ=0.5.

As shown in FIGS. 11(A), 11(B), 12(A), and 12(B), there can be set a characteristic difference that the cut-off frequency of the resonance suppression system with damping characteristic ζ=2.0 is 4200 Hz while the cut-off frequency of the harmonic suppression system with damping characteristic ζ=2.0 is 302 Hz. On the other hand, as to the step response characteristic, as shown in FIGS. 13 and 14, since ζ<1 in the conventional method, there is more or less oscillatory tendency with overshoots involved but the responsivity is successful.

In the power converter of the invention, the time constant of the resonance suppression system is on the order of a few hundreds μsec while the time constant of the harmonic suppression system is on the order of a few msec, making it possible to meet electrical-related time constants on the power supply side and mechanical-related time constants on the motor side.

Figure 15A:
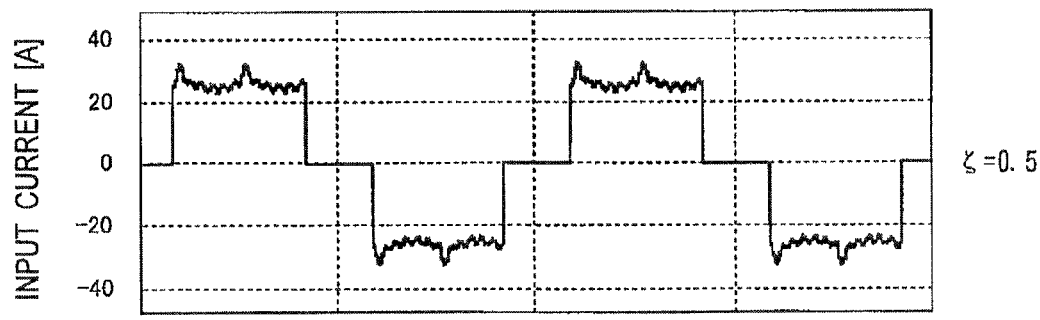
FIGS. 15(A), 15(B), 15(C) and 15(D) are views showing an input current waveform and a DC voltage waveform of the DC link section with damping characteristic $\zeta=0.5$ of the power converter, as well as an input current waveform and a DC voltage waveform of the DC link section with damping characteristic $\zeta=1.5$.
Figure 15B:
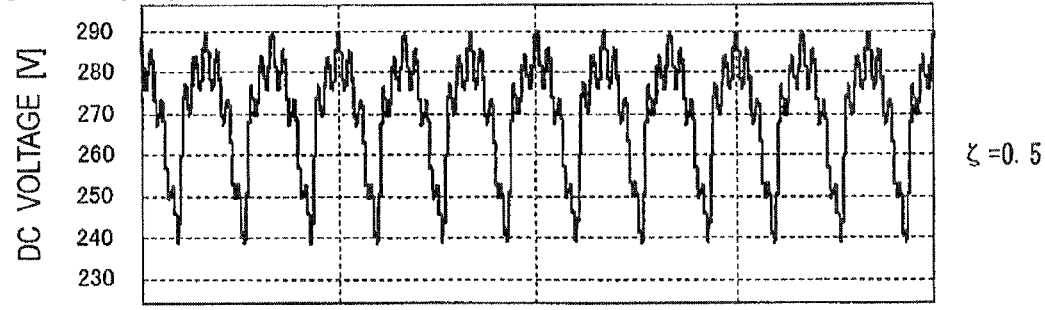
Figure 15C:
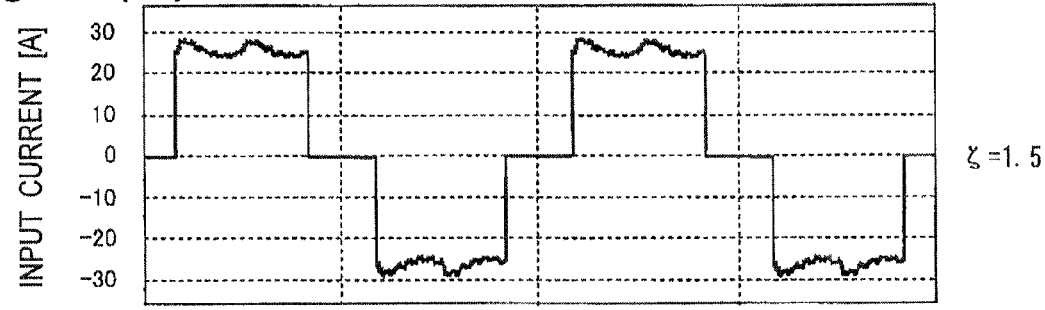
Figure 15D:
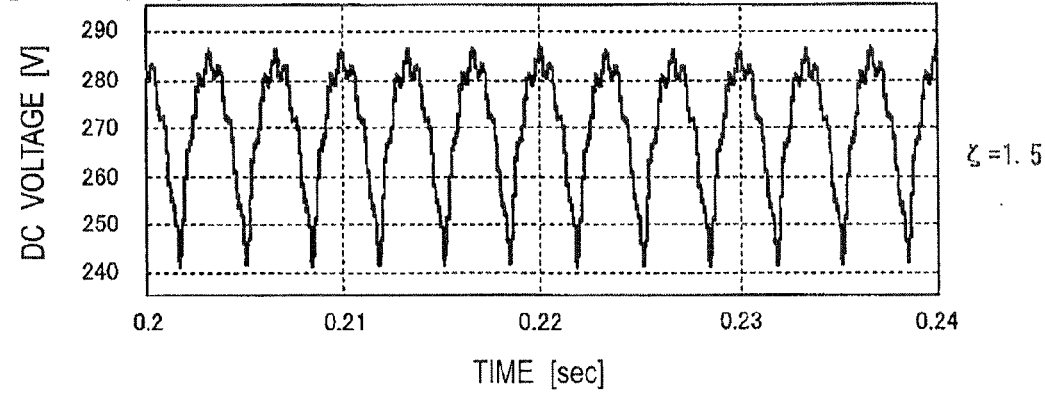
Figure 16A:
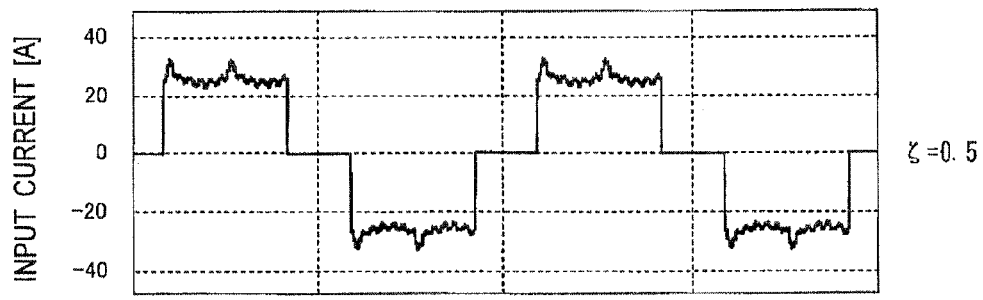
FIGS. 16(A), 16(B), 16(C) and 16(D) are views showing an input current waveform and a DC voltage waveform of the DC link section with damping characteristic $\zeta=0.5$ of the power converter, as well as an input current waveform and a DC voltage waveform of the DC link section with damping characteristic $\zeta=4.0$.
Figure 16B:
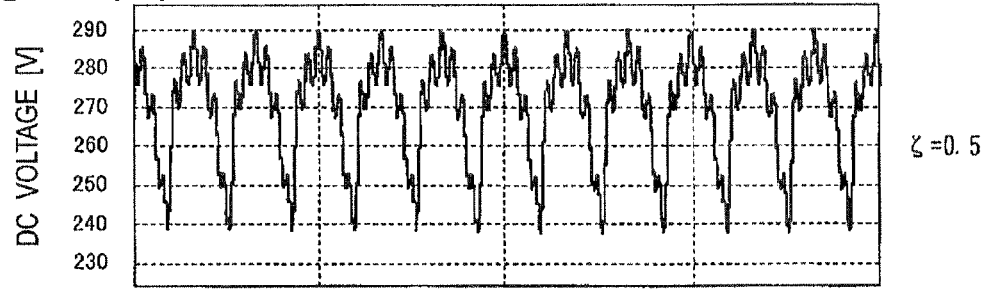
Figure 16C:
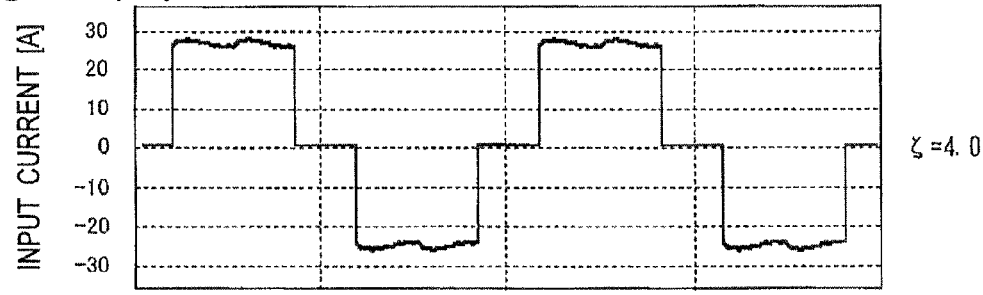
Figure 16D:
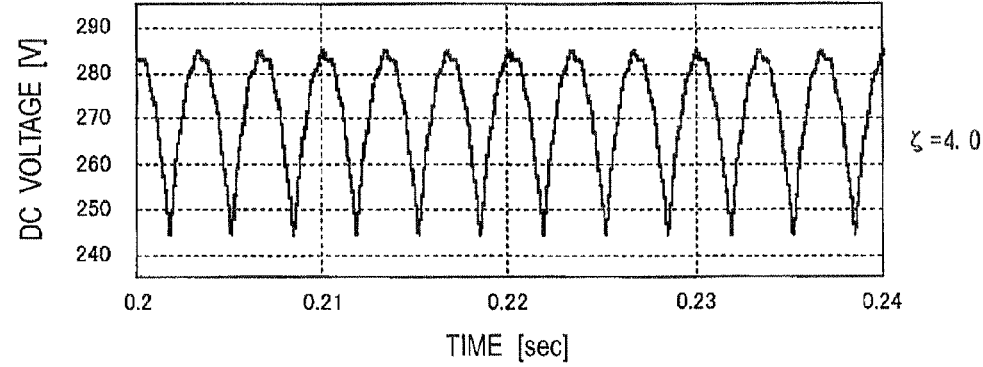

FIGS. 15(A) and 15(5) show an input current waveform and a DC voltage waveform of the DC link section with damping characteristic ζ=0.5 of the power converter. FIGS. 15(C) and 15(D) show an input current waveform and a DC voltage waveform of the DC link section with damping characteristic ζ=1.5. Also, FIGS. 16(A) and 16(B) show an input current waveform and a DC voltage waveform of the DC link section with damping characteristic ζ=0.5 of the power converter. FIGS. 16(C) and 16(D) show an input current waveform and a DC voltage waveform of the DC link section with damping characteristic ζ=4.0.

FIGS. 15(A)-15(D) and 16(A)-16(D) are simulations of influence of the setting of the damping coefficient ζ onto the power input waveform. FIGS. 15(A)-15(D) show cases of ζ=0.5 and ζ=1.5 (with cut-off frequency 420 Hz), and FIGS. 16(A)-16(D) show cases of ζ=0.5 and ζ=4.0 (with cut-off frequency 143 Hz). Simulation conditions are a power of 200 V, 50 Hz and 7 kW for input, where motor-side harmonics are simulated with the harmonic distribution corresponding to 50 Hz on the assumption that a 1800 Hz, 2A harmonic current flows through the DC link section.

As shown in FIGS. 15(A)-15(D) and 16(A)-16(D), in the case of the conventional method (ζ=0.5), although resonance due to the LC filter is suppressed, yet harmonic components due to the motor load are superimposed on the input current, causing influences as a harmonic voltage on the DC link voltage.

Meanwhile, in the case of the power converter of the invention, while motor harmonics are suppressed, pulsating currents of sextuple power frequency for modulating the voltage-type inverter so as to compensate pulsations can be maintained. This is because the sextuple power frequency, 300 Hz, is maintained because ζ=1.5 (cut-off frequency 420 Hz). In the case of FIGS. 16(C) and 16(D), because ζ=4.0 (cut-off frequency 143 Hz), the sextuple power frequency, 300 Hz (=50 Hz×6) is suppressed, causing the current ripple component to be smaller. This setting is suitable for constant current control in which no pulsating current compensation by voltage-type inverter is fulfilled.

Shunt values of harmonic currents to the reactor L and the capacitor C are expressed by the following Equation (15):

$$I_{Lh} = I_h \frac{\frac{1}{\omega L}}{\frac{1}{\omega L} + \omega C}, \quad I_{Ch} = I_h \frac{\omega C}{\frac{1}{\omega L} + \omega C} \tag{15}$$

Also, voltage drops of the reactor L and the capacitor C are expressed by the following Equation (16):

$$V_{Lh} = I_h \frac{\frac{1}{\omega L}}{\frac{1}{\omega L} + \omega C} \omega L = I_h \frac{\omega L}{1 + \omega^2 LC}, \tag{16}$$

$$V_{Ch} = I_h \frac{\omega C}{\frac{1}{\omega L} + \omega C} \frac{1}{\omega C} = I_h \frac{\omega C}{1 + \omega^2 LC}$$

In the power converter of this invention, since a harmonic current is detected as a voltage $V_L$ across the reactor L, Equation (17) for expressing the voltage detection gain is derived from the above Equations (15) and (16) as follows:

$$G(\omega) = \frac{\omega L}{1 + \omega^2 LC} \tag{17}$$

Also, a peak point can be determined by the following Equation (18) resulting from differentiation of the above Equation (17):

$$G(\omega)' = \frac{L(1 - \omega^2 LC)}{(1 + \omega^2 LC)^2} \tag{18}$$

A gain Gmax at the peak point is expressed as $$G_{max} = \frac{1}{2}\sqrt{\frac{L}{C}} \tag{19}$$

Figure 17:
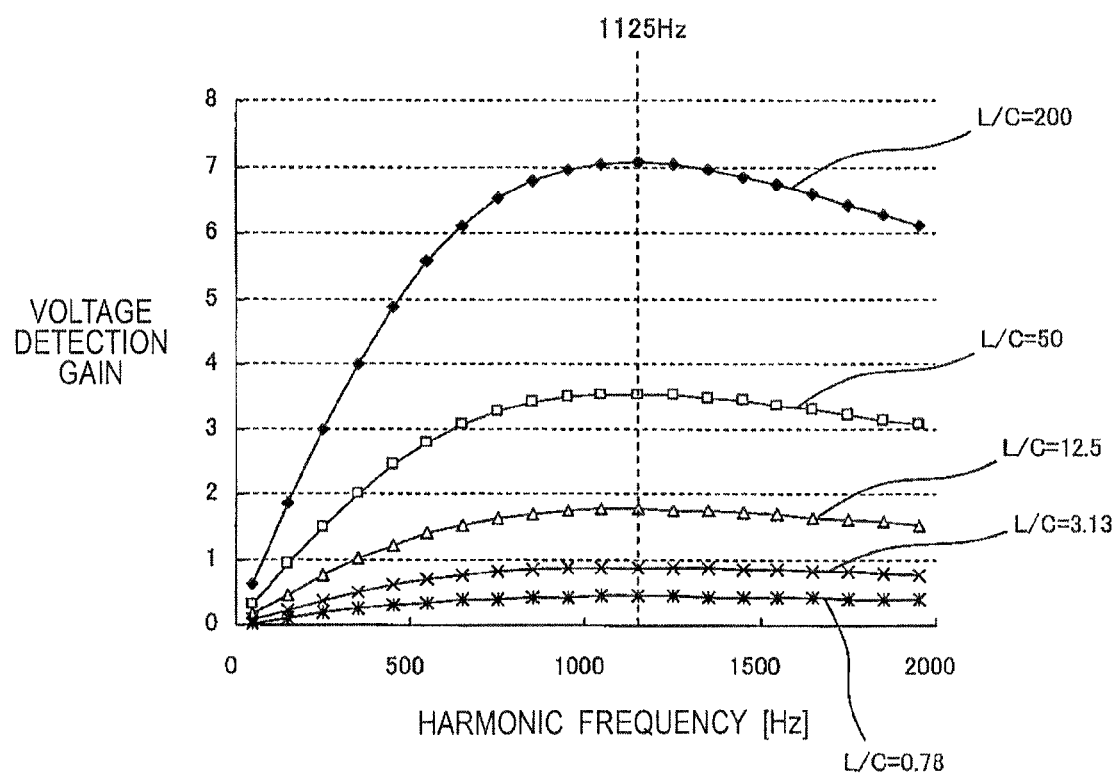
FIG. 17 is a view showing a voltage detection gain versus harmonic frequency characteristic of the power converter.

FIG. 17 shows a voltage detection gain versus harmonic frequency characteristic of the motor in the power converter, showing results of determining individual voltage detection gains as to respective L/C at equal resonance frequencies from the above Equation (17). In FIG. 17, '♦'-marked L/C equals 200 (=2 mH/10 μF), '□'-marked L/C equals 50 (=1 mH/20 μF), 'Δ'-marked L/C equals 12.5 (=0.5 mH/40 μF), 'x'-marked L/C equals 3.13 (≈0.25 mH/80 μF), and '∗'-marked L/C equals 0.78 (≈0.125 mH/160 μF).

In this case, since the voltage detection gain has an extreme value, it can be seen from the above Equation (18) that a maximum gain occurs at a resonance frequency of 1125 Hz (Equation (19)).

Also, it can be understood from the characteristics of FIG. 17 that detected voltage becomes larger in proportion to L/C.

As shown above, in the power converter of this first embodiment, since the voltage $V_L$ across the reactor L is detected, AC current components alone of resonance current and harmonic current are detected without being affected by input current, the amplitude may be a small one and, from the relationship of FIG. 17, the L value may be set small at equal resonance frequency, thus allowing the reactor to be downsized.

Figure 18A:
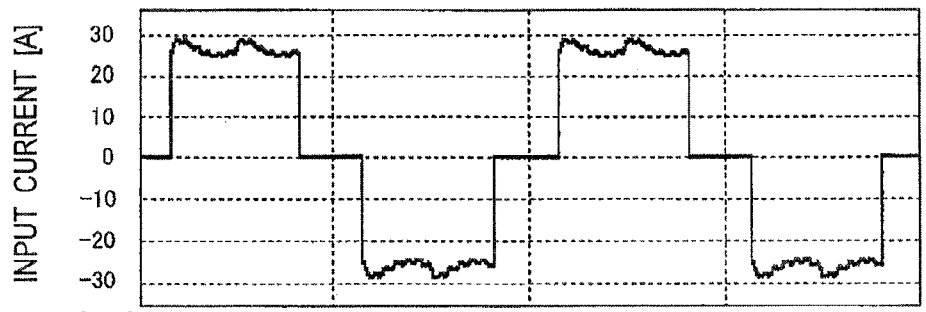
FIGS. 18(A), 18(B), 18(C) and 18(D) are views showing simulation waveforms of the power converter.
Figure 18B:
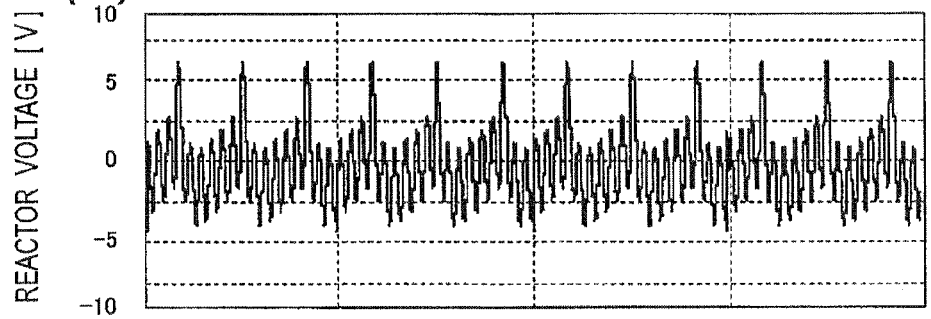
Figure 18C:
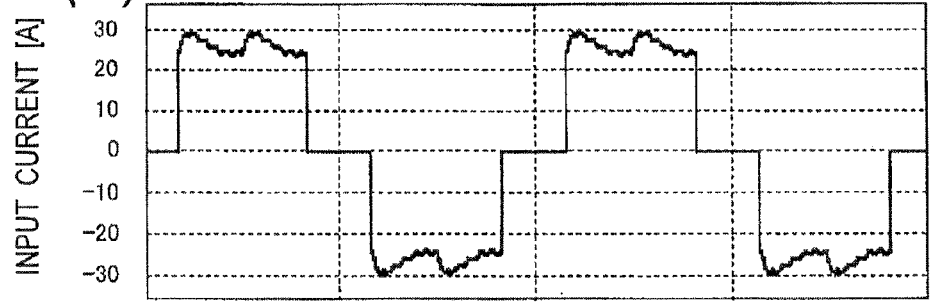

FIGS. 18(A)-18(D) show simulation waveforms of the power converter. FIGS. 18(A) and 18(C) chart the input current and FIGS. 18(B) and 18(D) chart the reactor voltage.

Figure 18D:
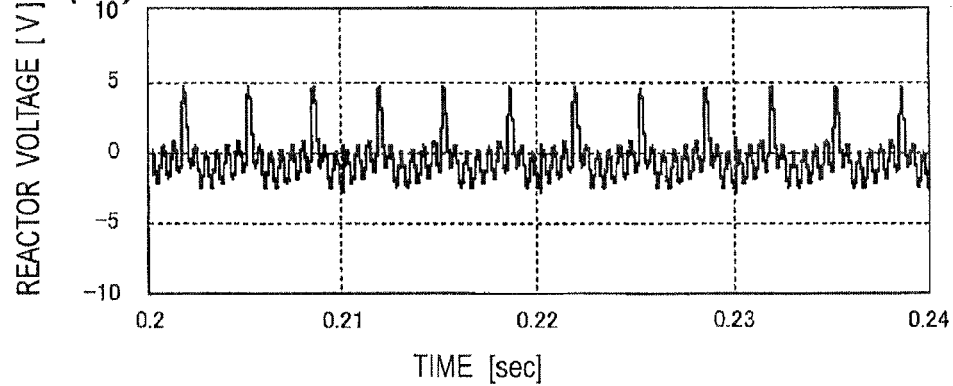

FIGS. 18(A) and (B) show simulation results at L=0.5 mH, C=40 μF, L/C=12.5. FIGS. 18(C) and (D) show simulation results at L=0.25 mH, C=80 μF, L/C=3.13. These simulations have been performed under the same conditions as in the case of FIG. 15 except the constants of L and C. As shown in the waveforms of FIGS. 18(C) and 18(D), setting the L value to ½ causes the reactor voltage to become ½.

Meanwhile, in a case where the harmonic standard of IEC61000-3-12 is applied, there are some cases where do matter 20th- or higher-order harmonic components as defined by not only total harmonic distortions THD but also partially weighted harmonic distortions PWHD. In such a case, 11th-order and 13th-order components of small contents as shown in FIG. 5 have influences, so that the current appearing to the DC link section becomes smaller. Thus, there is a need for setting the reactor voltage larger, as converse to the above, to enhance the detection sensitivity.

In addition, as described in Technical Literature (JP 2007-202378A), a standard capacitance $C_R$ [F] of the capacitor C is determined by the inductance of the motor load, the power supply inductance, the capacitor charging voltage, the power consumption of the motor load, the frequency of the ripple component of the DC link voltage, and the motor exciting current so that harmonics are lessened and moreover breakdown of circuit elements due to operation halt of the inverter section is prevented. Further, with combinational use of a DC clamp or other circuit for absorbing load induced power, the standard capacitance is determined by the permissible ripple current or temperature-increased value of the capacitor C. Based on this standard capacitance $C_R$ of the capacitor C and the resonance frequency of the LC filter, the inductance $L_R$ [H] of the reactor L is determined.

According to the power converter constructed as described above, it becomes implementable to lower the cut-off frequency of the resonance suppression system for suppressing resonance due to the LC filter in terms of transfer characteristics of the input voltage of the inverter section 12 versus DC voltage derived from the diode bridge 11, and to raise the cut-off frequency of the harmonic suppression system for suppressing harmonics due to an inductive load in terms of transfer characteristics of the DC current flowing through the reactor L versus input current of the inverter section 12. With the control of the inverter section 12 by the controller 100 based on such transfer characteristics of the control system as described above, it becomes possible to effectively suppress harmonics due to the inductive load while suppressing resonance due to the LC filter, thus making it possible to fulfill optimum control of good responsivity to the inductive load such as a motor.

Also, by satisfying the condition that $L/C<L_R/C_R$, it becomes possible to downsize the reactor L while suppressing resonance due to the LC filter and harmonics of the inductive load.

Also, by satisfying the condition that $L/C>L_R/C_R$, it becomes possible to suppress higher-order harmonics of the inductive load while suppressing resonance due to the LC filter.

Also, by the setting that the cut-off frequency that is a transfer characteristic of the DC current flowing through the reactor L versus input current of the inverter section 12 is larger than the repetition frequency of ripple components contained in a DC voltage outputted from the diode bridge 11, it becomes possible to fulfill control suitable for the inverter section 12 that performs control to compensate ripple components contained in the DC voltage outputted from the diode bridge 11.

Also, by the setting that the cut-off frequency that is a transfer characteristic of the DC current flowing through the reactor L versus input current of the inverter section 12 is smaller than the repetition frequency of ripple components contained in a DC voltage outputted from the diode bridge 11, it becomes possible to fulfill control suitable for the inverter section 12 that performs constant current control.

Also, since AC components of resonance current and harmonic current flow through the reactor L connected between one output end of the diode bridge 11 and one input end of the inverter section 12, detecting a voltage across the reactor L by the voltage detector 101 makes it possible to obtain a voltage signal suitable for control of resonance suppression and harmonic suppression of the inverter section 12.

Figure 19:
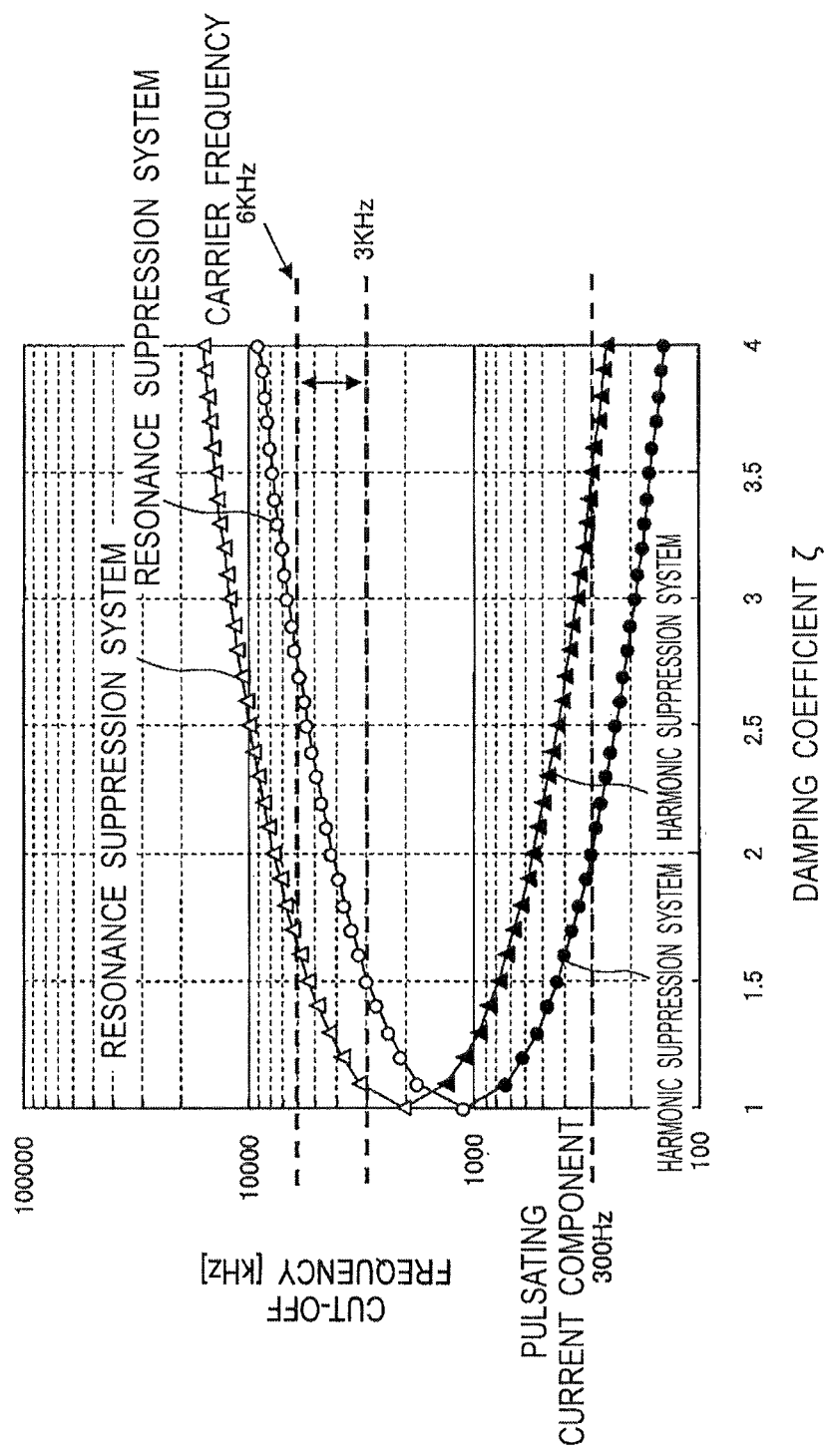
FIG. 19 is a chart showing a cut-off frequency versus damping coefficient characteristic of the resonance suppression system as well as a cut-off frequency versus damping coefficient characteristic of the harmonic suppression system in the power converter.

FIG. 19 shows a cut-off frequency versus damping coefficient characteristic of the resonance suppression system as well as a cut-off frequency versus damping coefficient characteristic of the harmonic suppression system in the power converter of the first embodiment. In FIG. 19, the horizontal axis represents damping coefficient while the vertical axis represents cut-off frequency [Hz]. In this case, '○' mark denotes cut-off frequency characteristics of the resonance suppression system and '●' mark denotes cut-off frequency characteristics of the harmonic suppression system (L=0.5 mH, C=40 μF). Also, 'Δ' mark denotes cut-off frequency characteristics of the resonance suppression system and '▲' mark denotes cut-off frequency characteristics of the harmonic suppression system (L-150 μH, C=40 μF).

In FIG. 19, the frequency of the three-phase AC voltage is set to 50 Hz and the carrier frequency of the inverter section 12 is set to 6 kHz. In this case, with circuit constants of the LC filter being L=0.5 mH and C=40 μF, when the cut-off frequency of the harmonic suppression system is set so as to maintain the current pulsating component (300 Hz), a settable damping coefficient ζ becomes about 1.5 at a maximum. With this damping coefficient ζ=1.5, the cut-off frequency of the resonance suppression system becomes 3 kHz, which is about ½ of the carrier frequency of 6 kHz and which is a limit of the possibility that the control system can be stably controlled without being affected by phase delay due to sampling.

Further, with circuit constants of the LC filter being L=150 μH and C=40 μF and with the resonance frequency set high, the damping coefficient ζ is about 1.1 due to a stability limit of the control system. In this case, it becomes difficult to widen the harmonic suppression band (frequency band higher than the cut-off frequency of the harmonic suppression system).

As shown above, as the resonance frequency of the LC filter becomes nearer to the sampling frequency, it becomes difficult to secure the stability of the control system. Particularly in the case of air-conditioning use inverters, since a hermetic-sealed motor is contained in a compressor, involving less problems with vibrational buzzes due to the carrier, the DC voltage and current of the DC link section are controlled so as to be pulsated at 300-360 Hz, which is sextuple frequencies of the power supply frequency, so that the resonance frequency of the LC filter becomes about 500 Hz-1 kHz, with the result that the resonance frequency of the LC filter and the sampling frequency become nearer to each other.

(Second Embodiment)

Next, a power converter according to a second embodiment, which is enabled to improve the stability of the control system of the power converter according to the first embodiment, will be described below.

The power converter of the second embodiment of the invention is similar in construction to the power converter of the first embodiment shown in FIG. 1 except the operation of the controller 100, and therefore FIGS. 1 and 2 are used for reference.

Figure 20A:
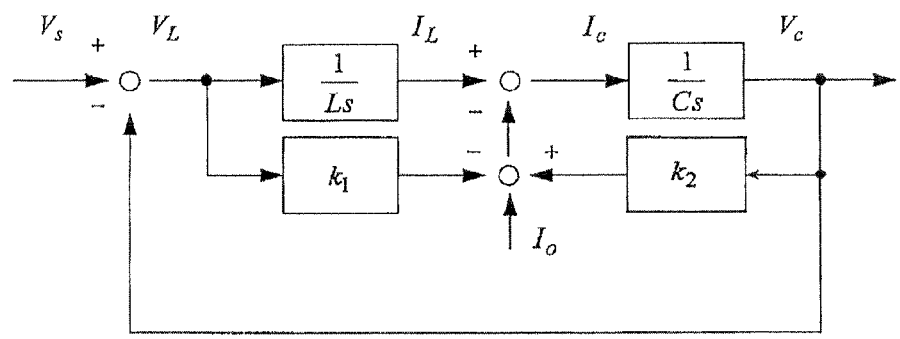
FIGS. 20(A), 20(B) and 20(C) are block diagrams of a power converter according to a second embodiment of the invention.
Figure 20B:
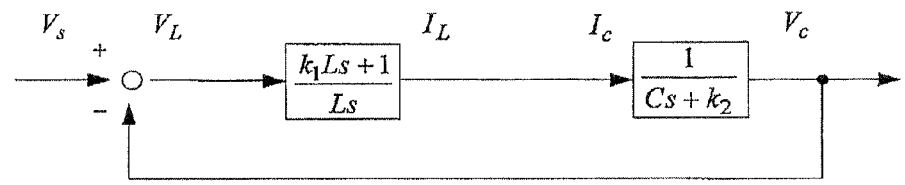
Figure 20C:
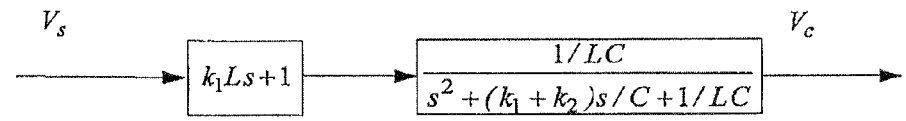

FIGS. 20(A), 20(B) and 20(C) show block diagrams of the power converter of the second embodiment.

FIG. 20(A)-20(C), which are block diagrams resulting from determining characteristics of the resonance suppression system with the voltage $V_L$ across the reactor L used for resonance suppression, show transfer characteristics of the voltage $V_c$ across the capacitor C (i.e., input voltage of the inverter section 12) versus the DC voltage $V_s$ outputted from the diode bridge 11.

It can be seen that executing equivalent transformation in the order of FIG. 20(A)-FIG. 20(C) finally results in a series system composed of a differential system (phase lead element) and a second-order system (second-order lag element) shown in FIG. 20(C). Thus, the controller 100 controls the inverter section 12 so as to meet a damping characteristic that the phase lead element and the second-order lag element shown in FIG. 20(C) are connected in series.

The block diagram of FIG. 20(A) differs from the block diagram of the power converter of the first embodiment in that there is provided a DC voltage feedback (second feedback loop) of a gain $k_2$ for positive feedback of the voltage $V_c$ across the capacitor C (i.e., input voltage of the inverter section 12) to the input current $I_c$ of the inverter section 12. In this case, a gain $k_1$ is set for reactor voltage feedback (first feedback loop) for negative feedback of the voltage $V_L$ across the reactor L to the input current $I_c$ of the inverter section 12.

In the power converter of the second embodiment, with use of the reactor voltage feedback for negatively feeding back the voltage $V_L$ across the reactor L to the input current $I_0$ of the inverter section 12 in combination with the DC voltage feedback for positively feeding back the input voltage $V_c$ of the inverter section 12 to the input current $I_0$ of the inverter section 12, there are provided degrees of freedom for cut-off frequencies of the differential system and the second-order system, respectively, so that the frequency band of the resonance suppression system (band of lower frequencies than the cut-off frequency of the resonance suppression system) is limited depending on selections of the circuit constants of the LC filter, the gain $k_1$ of the first feedback loop, the gain $k_2$ of the second feedback loop, and the like.

FIGS. 21(A) and 21(B) show characteristics of the resonance suppression system in the power converter of the first embodiment. In FIGS. 21(A) and 21(B), it is set that gain k=0.849 and ζ=1.5. As in FIG. 21(A), since the differential system (broken line) and the second-order system (one-dot chain line) coincidentally have a cut-off frequency f1, the cut-off frequency of the resonance suppression system (solid line) corresponds to a higher-side cut-off frequency f2 of the second-order system.

Figure 22A:
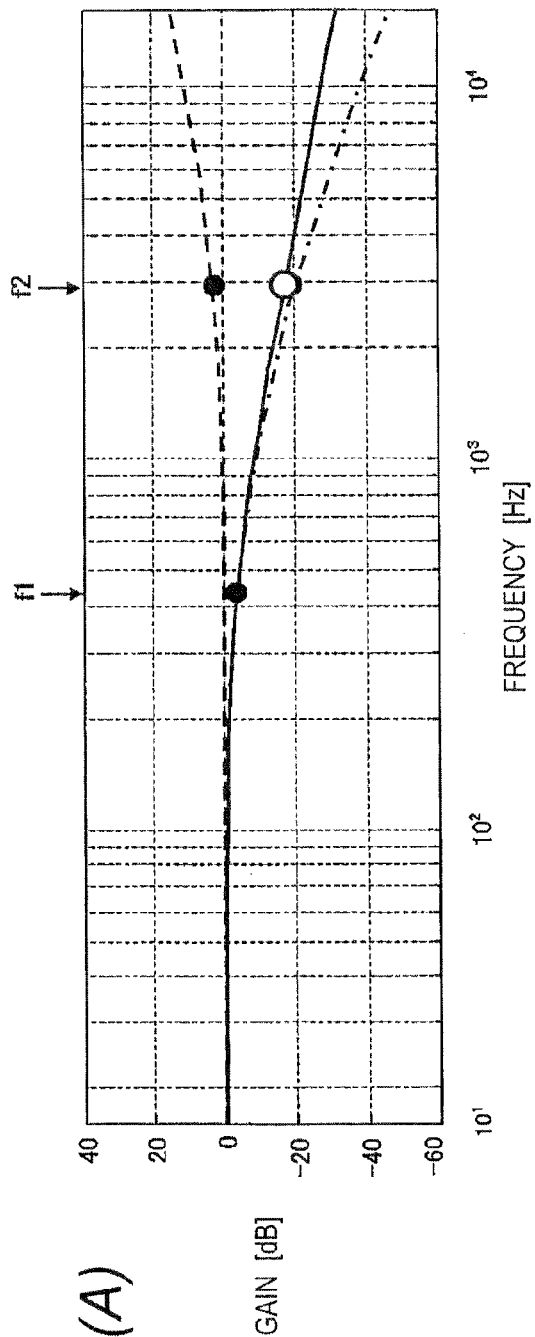
FIGS. 22(A) and 22(B) are Bode diagrams showing characteristics of the resonance suppression system in the power converter of the second embodiment.
Figure 22B:
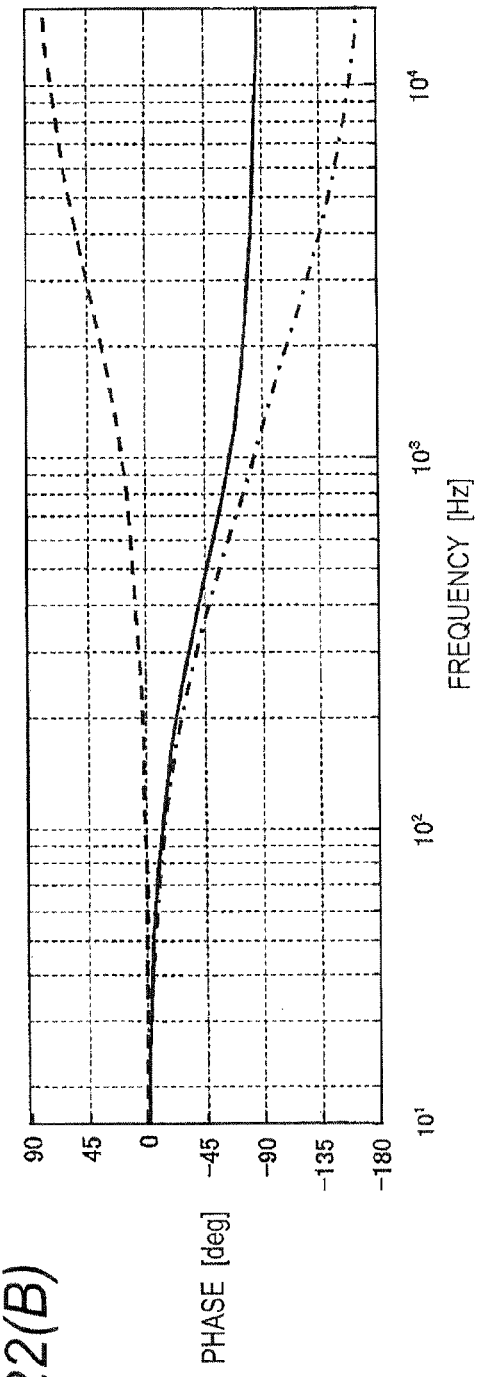

In contrast to this, FIGS. 22(A) and 22(B) show characteristics of the resonance suppression system in the power converter of the second embodiment. In FIGS. 22(A) and 22(3), it is set that gain $k_1$=0.108, $k_2$=0.741 and ζ=1.31. In the characteristics of the resonance suppression system shown in FIG. 22, a gain $k_1+k_2$ is first determined so that the damping coefficient ζ becomes 1.5 as in the case of FIGS. 21(A) and 21(B), and then the gain $k_1$ is set so that the cut-off frequency of the differential system (broken line) coincides with the higher-side cut-off frequency f2 of the second-order system (one-dot chain line). In this case, by operation leading to the only result that the region over the higher-side cut-off frequency f2 of the second-order system (solid line) corresponds to the first-order lag system, the cut-off frequency of the resonance suppression system can be set to the lower-side cut-off frequency f1.

FIGS. 23(A)-23(D) and FIG. 24(A), 24(B) are block diagrams for explaining the stability of the power converter of the second embodiment.

Figure 23A:
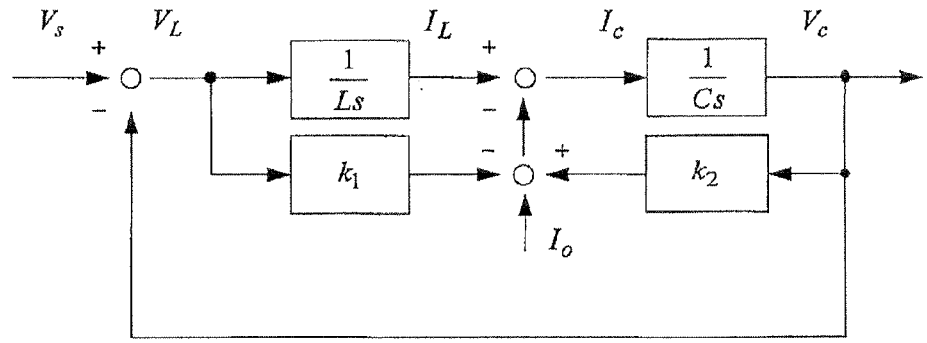
FIGS. 23(A), 23(B), 23(C) and 23(D) are block diagrams for explaining the stability of the power converter.
Figure 23B:
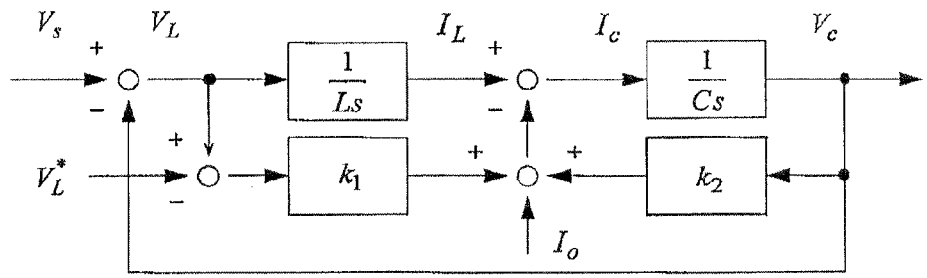
Figure 23C:
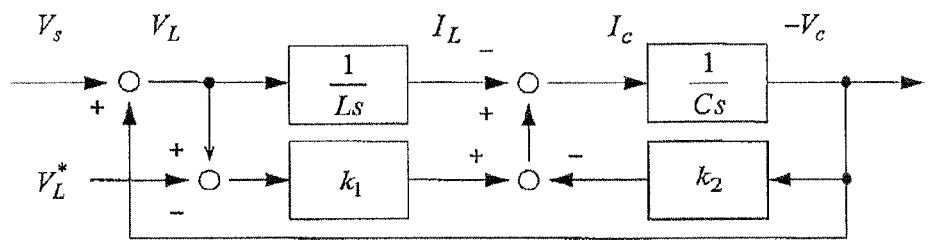
Figure 23D:
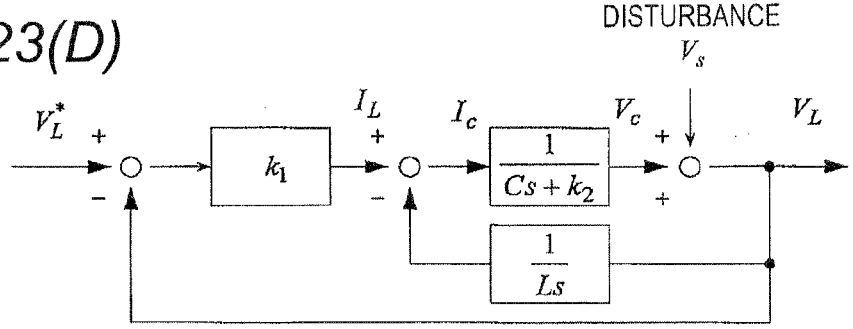
Figure 24A:
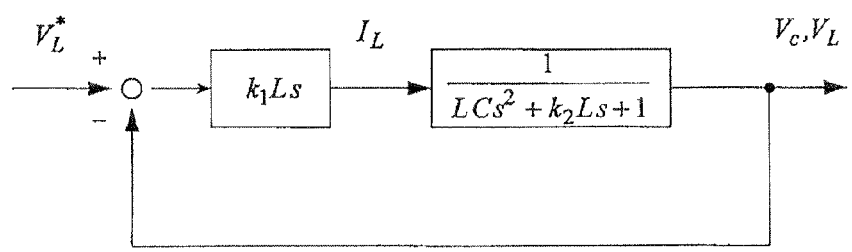
FIGS. 24(A) and 24(B) are block diagrams for explaining the stability of the power converter.
Figure 24B:
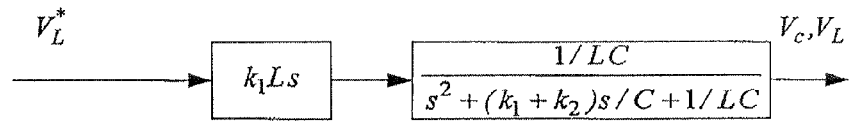
Figure 25A:
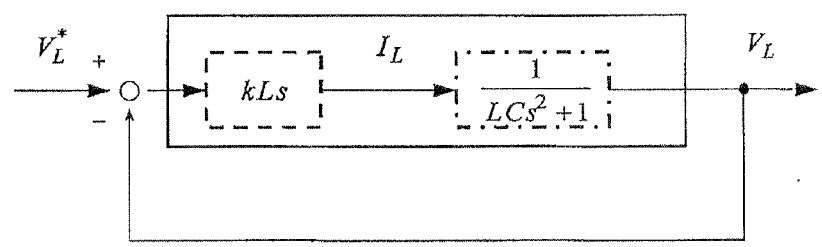
FIGS. 25(A) and 25(B) are diagrams showing the transfer function for explaining gain margin of the power converter of the first embodiment.
Figure 25B:
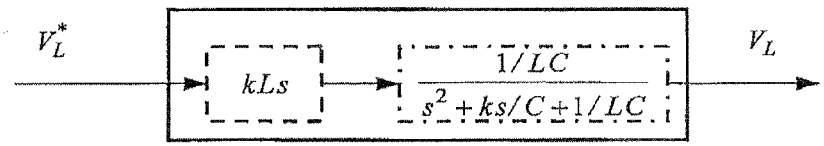
Figure 26A:
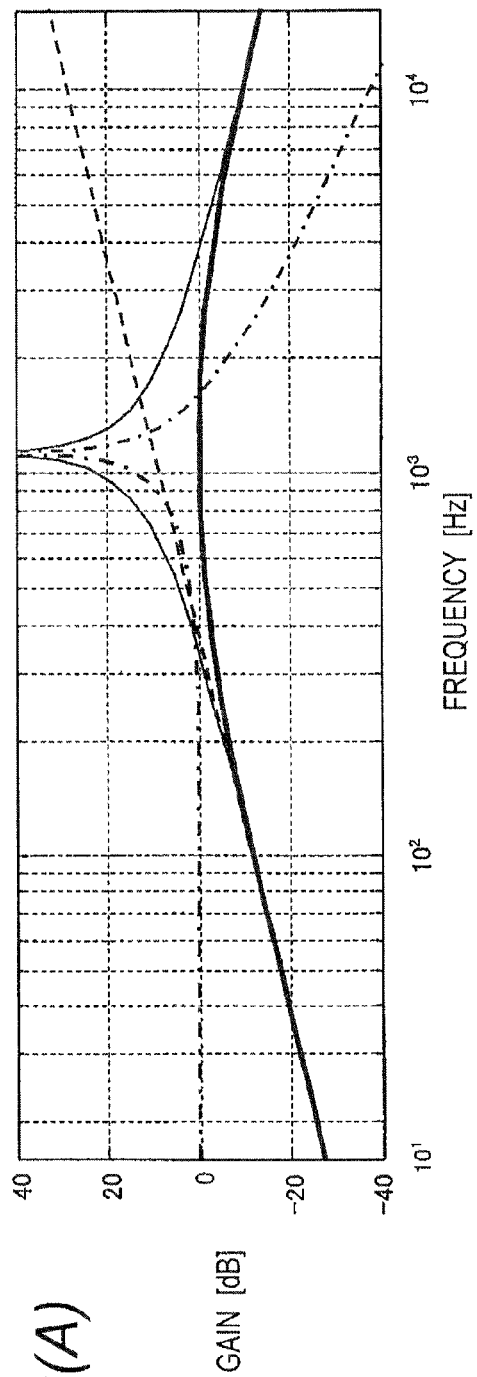
FIGS. 26(A) and 26(B) are Bode diagrams for explaining the gain margin of the power converter of the first embodiment.
Figure 26B:
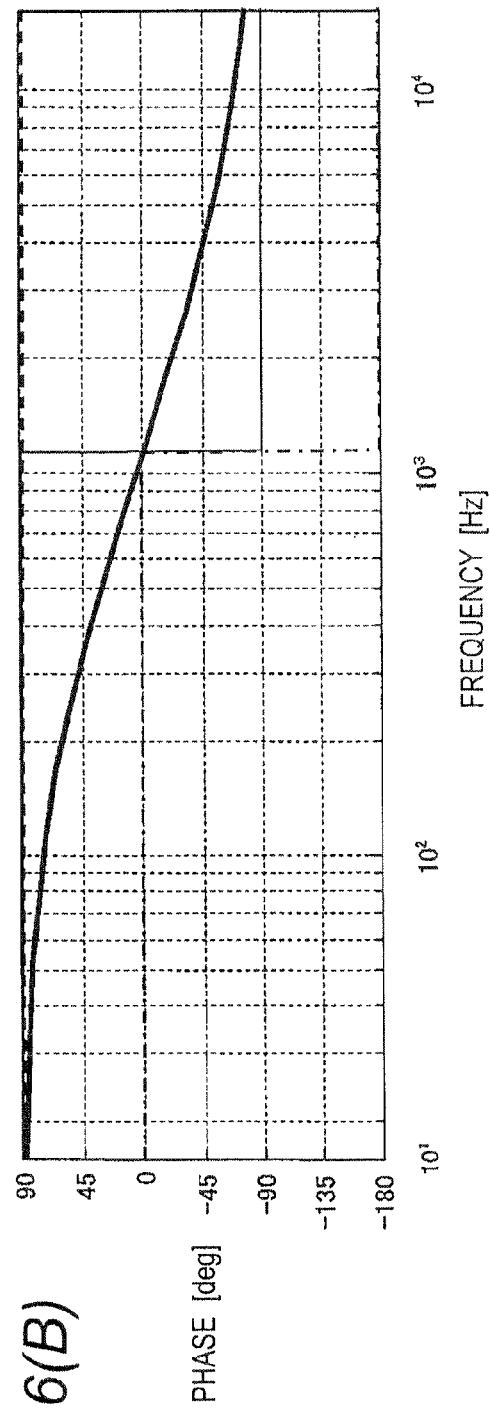
Figure 27A:
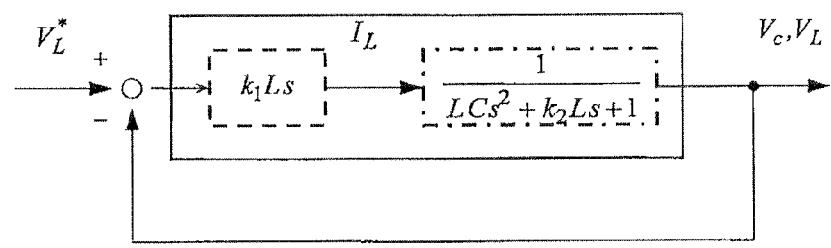
FIGS. 27(A) and 27(B) are diagrams showing the transfer function for explaining gain margin of the power converter of the second embodiment.
Figure 27B:
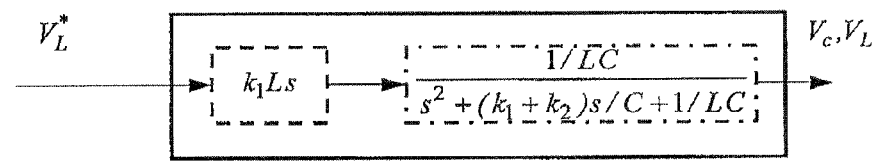

With the control system of FIG. 23(A) (shown in FIG. 20(A)) subjected to equivalent transformation in the order of FIG. 23(B)-(D) and FIG. 24(A), (B), as it is expressed by the control system that controls the voltage $V_L$ across the reactor L based on a target voltage $V_L^*$, it can be regarded that the resonance suppression system suppresses power disturbance of the control system with $V_L$=0. Accordingly, the stability of the control system can be ensured by making adjustments of gains $k_1$, $k_2$ for the control system with $V_L$=0.

FIGS. 25(A), 25(B), 26(A) and 26(B) show the transfer function and Bode diagrams for explaining gain margin of the power converter of the first embodiment for comparison. FIGS. 27(A), 27(B), 28(A) and 28(B) show the transfer function and Bode diagrams for explaining gain margin of the power converter of this second embodiment. In FIGS. 25(A), 25(B), 26(A), 26(B), 27(A), 27(B), 28(A) and 28(B), broken lines represent the differential system, one-dot chain lines represent the second-order system, thin solid lines represent the series system of the differential system and the second-order system, and bold solid lines represent the control system (damping characteristic of a series connection of the phase lead element and the second-order lag element) that controls the voltage $V_L$ across the reactor L based on the target voltage $V_L^*$.

With the construction of the first embodiment in FIGS. 25(A), 25(B), 26(A) and 26(B), as shown by the above Equation (10), since the 0 dB point of the derivative gain is lower than the resonance frequency, the open-loop gain becomes larger, so that the gain becomes 0 dB or more at ½ (3 kHz) of the carrier frequency 6 kHz shown in FIG. 19, hence an instability.

In contrast to this, with the power converter of this second embodiment, by making use of the degree of freedom for gain setting as shown in FIGS. 27(A), 27(B), 28(A) and 28(B), the derivative gain $k_1$ is set so as to become equal to the higher-side cut-off frequency f2 as shown in FIGS. 22(A) and 22(3). Therefore, at 3 kHz, enough gain margin as much as −20 dB can be ensured.

Figure 29A:
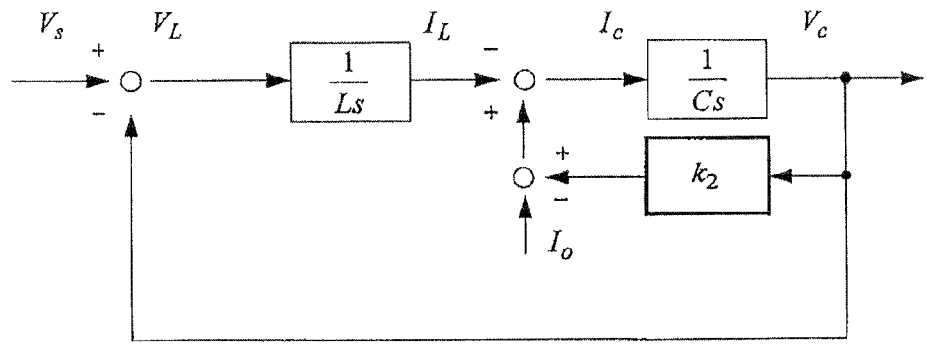
FIGS. 29(A), 29(B), 29(C) and 29(D) are diagrams showing the transfer function for explaining the stability of a power converter according to a modification of the second embodiment.
Figure 29B:
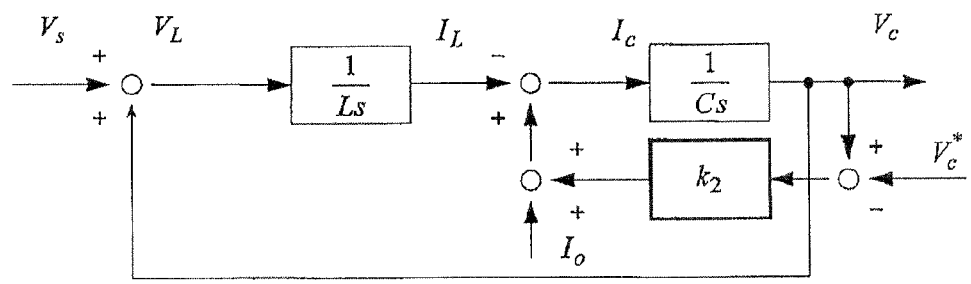
Figure 29C:
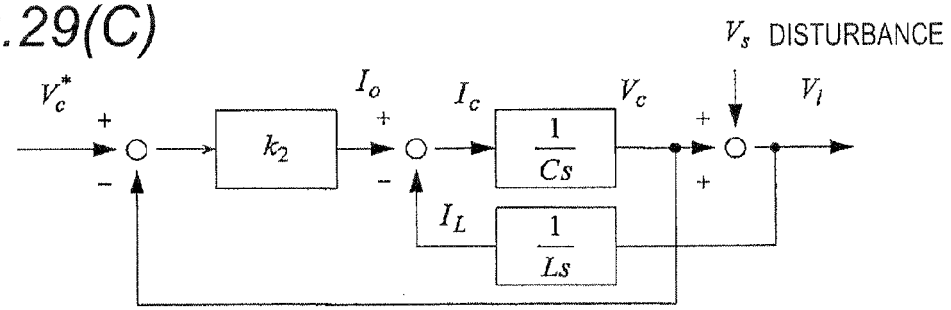
Figure 29D:
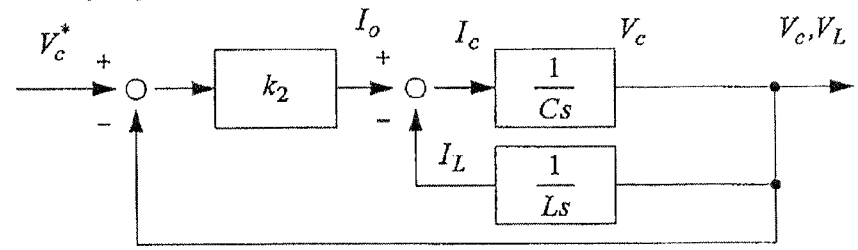
Figure 30A:
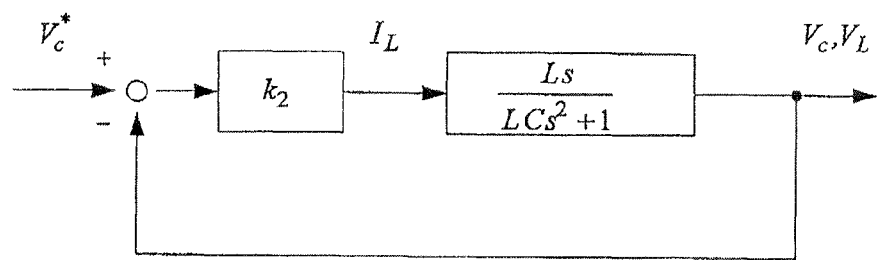
FIGS. 30(A) and 30(B) are diagrams showing the transfer function for explaining the stability of the power converter.
Figure 30B:

FIGS. 29(A), 29(B), 29(C), 29(D), 30(A) and 30(B) show the transfer function for explaining the stability of an modification of the power converter of the second embodiment, where the gain $k_1$ of reactor voltage feedback (first feedback loop) of the voltage $V_L$ across the reactor L is set approximately to zero. In FIG. 29(A), the reactor voltage feedback is omitted.

In the resonance suppression system, the control system of FIG. 29(A), where $k_1 \approx 0$, is subjected to equivalent transformation in the order of FIG. 29(B)-29(D) and FIG. 29(A), 29(B), followed by expression by the control system that controls the voltage $V_L$ across the reactor L and the voltage $V_c$ across the capacitor C based on the DC target voltage $V_L^*$.

As shown above, it is also allowable to apply the DC voltage feedback (positive feedback of the input voltage $V_c$ of the inverter section 12 to the input current $I_0$ of the inverter section 12) alone. This results in the same transfer characteristics as in the case where the reactor voltage feedback (negative feedback of the voltage $V_L$ across the reactor L to the input current $I_0$ of the inverter section 12) of the power converter of the first embodiment is applied alone, as shown by the results of the equivalent transformation of the input voltage $V_c$ to the control system in FIGS. 29(A)-29(D), 30(A) and 30(B). In this case, on condition that the carrier frequency and the resonance frequency are close to each other, a stability similar to that of the power converter of the first embodiment can be obtained.

Figure 31A:
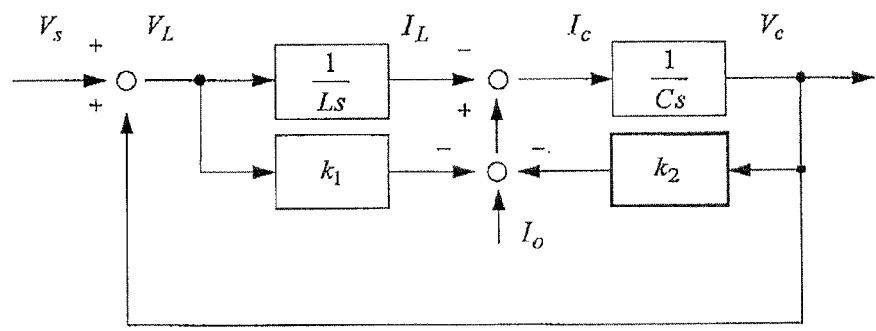
FIGS. 31(A), 31(B) and 31(C) are diagrams showing the transfer function for explaining the characteristics of the harmonic suppression system in the power converter of the second embodiment.
Figure 31B:
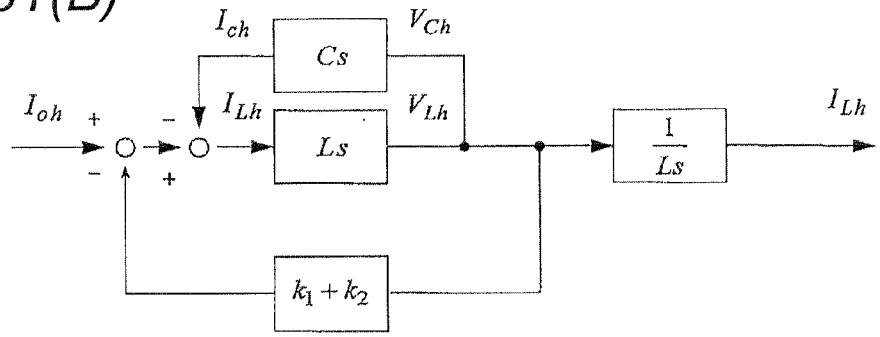
Figure 31C:
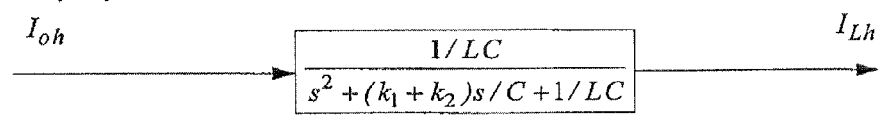

FIGS. 31(A), 31(B) and 31(C) show the transfer function for explaining the characteristics of the harmonic suppression system in the power converter of the second embodiment.

In the equivalent circuit of FIG. 8 in which the harmonic current is shunted, a transfer characteristic of the voltage $V_c$ across the capacitor C versus the DC voltage $V_s$ outputted from the diode bridge 11 is shown in FIG. 31(A).

Next, with the harmonic current alone taken into account, since it can be regarded that $V_{L\_h} = V_{c\_h}$, the transfer characteristic is converted to a transfer characteristic of the reactor current $i_{L\_h}$ versus the DC link current $i_{o\_h}$ as shown in FIG. 31(B).

Next, executing equivalent transformation as shown in FIG. 31(C) results in the same transfer characteristic shown in FIG. 9(F) of the power converter of the first embodiment.

With use of the DC voltage feedback (positive feedback of the input voltage $V_c$ of the inverter section 12 to the input current $I_0$ of the inverter section 12) in combination with the reactor voltage feedback (negative feedback of the voltage $V_L$ across the reactor L to the input current $I_0$ of the inverter section 12), it follows that the DC voltage feedback (positive feedback of the input voltage $V_c$ of the inverter section 12 to the input current $I_0$ of the inverter section 12) alone results in the second-order system, so that the characteristic is determined by the lower-side cut-off frequency.

In the case of the power converter of the second embodiment, in assembling process of the control system, a high-pass filter is also used in the DC voltage feedback loop because the DC voltage feedback (positive feedback of the input voltage $V_c$ of the inverter section 12 to the input current $I_0$ of the inverter section 12) contains direct current and power ripple components. The high-pass filter provided in the DC voltage feedback loop is under a restraint for the lower limit of the cut-off frequency of the high-pass filter because of power ripple removal, having influence on the characteristics of the resonance suppression system.

Figure 32A:
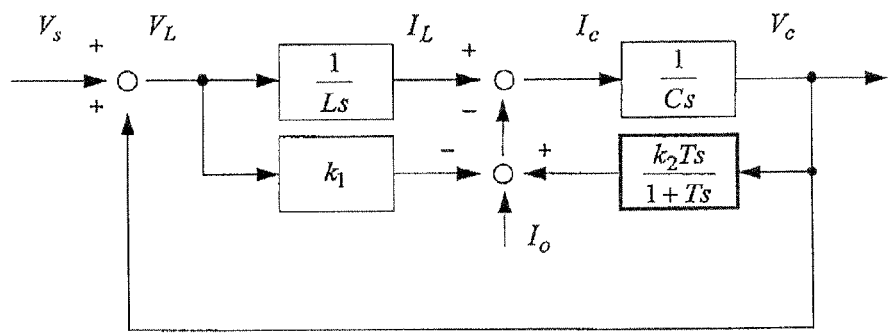
FIG. 32(A) is a view showing the transfer function with a DC-cutting high-pass filter applied to the power converter of the second embodiment.
Figure 32B:
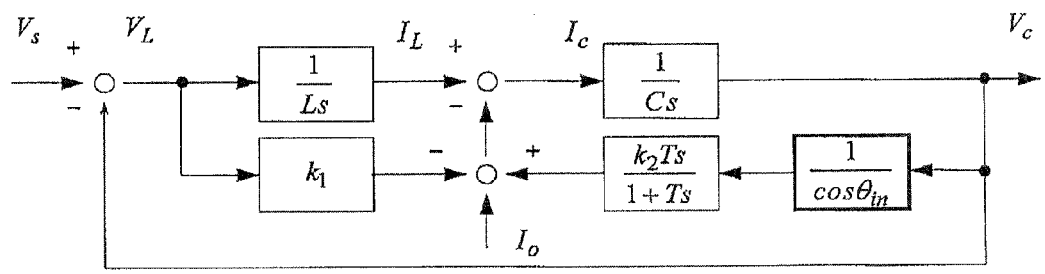
FIG. 32(B) is a view showing the transfer function with a DC-cutting high-pass filter and a ripple removal section applied to the power converter of the second embodiment.

FIG. 32(A) shows the transfer function with a DC-cutting high-pass filter applied to the power converter of the second embodiment. FIG. 32(B) shows the transfer function with a DC-cutting high-pass filter and a ripple removal section applied.

Figure 33:
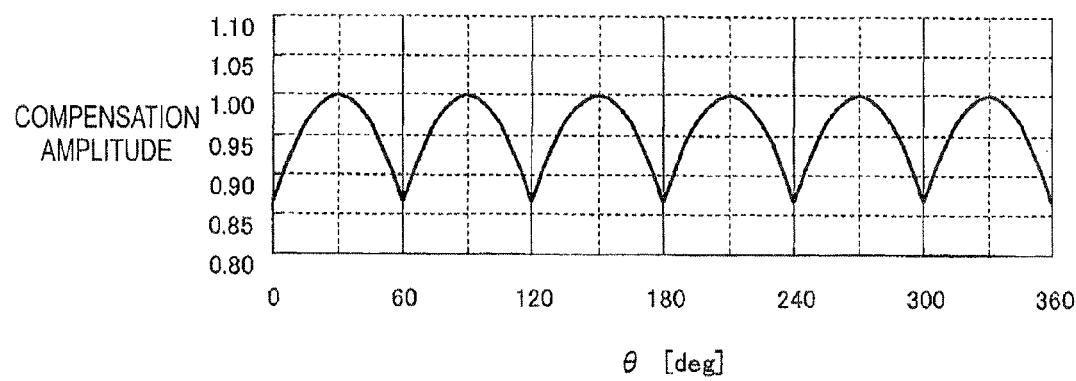
FIG. 33 is a chart showing an amplitude characteristic of the ripple voltage.

FIG. 33 shows an amplitude characteristic of the ripple voltage to be used for the ripple removal section.

In this ripple removal section, its $\cos \theta_{i\_n}$ is expressed by the following equation, where ripple removal is performed by using a table or function:

$$\cos \theta_{in} = \max(|\cos \theta_{rs}|, |\cos \theta_{st}|, |\cos \theta_{ts}|)$$

This $\cos \theta_{i\_n}$ of the ripple removal section is synchronized with the frequency of the three-phase AC power supply 10 by PLL (Phase-Locked Loop) or the like.

FIGS. 34(A) and 34(B) show Bode diagrams with a DC-cutting high-pass filter and a ripple removal section applied to the power converter of the second embodiment. In FIGS. 34(A) and 34(B), broken lines represent characteristics with neither the DC-cutting high-pass filter nor the ripple removal section applied, one-dot chain lines represent characteristics with the DC-cutting high-pass filter applied, and solid lines represent characteristics with the ripple removal section applied.

In the case of FIG. 32(A), a high-pass filter of 1 kHz is applied to the characteristics shown by the solid lines in FIGS. 34(A) and 34(B), where the reactor voltage feedback (negative feedback of the voltage $V_L$ across the reactor L to the input current $I_0$ of the inverter section 12) is noticeable in the region of 1 kHz or lower. In addition, in the case of FIG. 32(B), since only the DC component needs to be removed, the cut-off frequency of the high-pass filter is set to 1 Hz or lower, being omitted in expression in FIG. 34(B).

Since the filter characteristics are attributed to the ripple frequency component, the frequency components are separated into DC components and harmonic components by $1/\cos \theta_{i\_n}$ shown in FIG. 32(B). Therefore, setting the cut-off frequency of the high-pass filter to sufficiently low frequencies in which DC components are removable makes it possible to minimize characteristic deteriorations.

Figure 35:
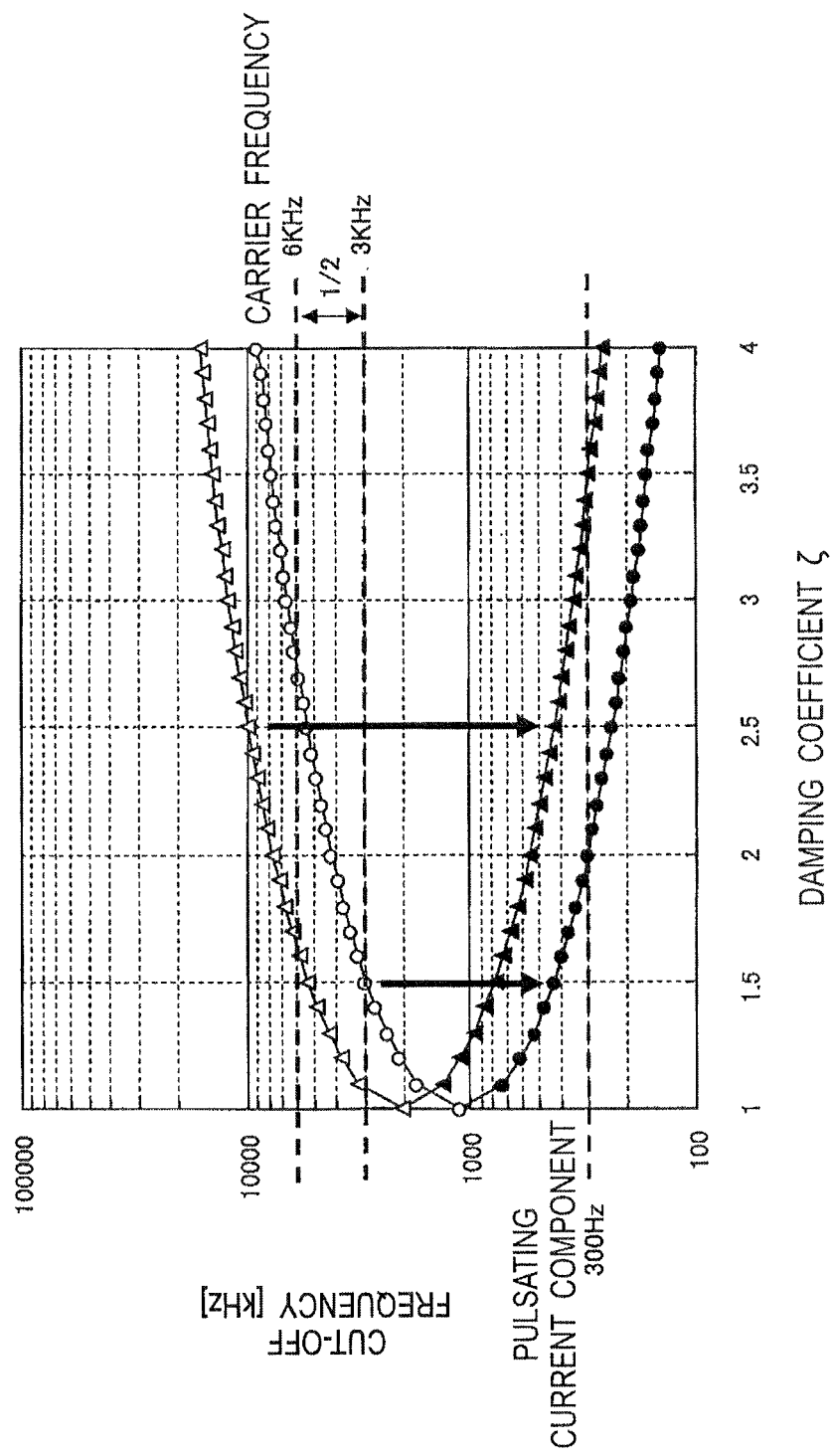
FIG. 35 is a chart showing a cut-off frequency versus damping coefficient characteristic of the resonance suppression system as well as a cut-off frequency versus damping coefficient characteristic of the harmonic suppression system in the power converter of the second embodiment.
Figure 36A:
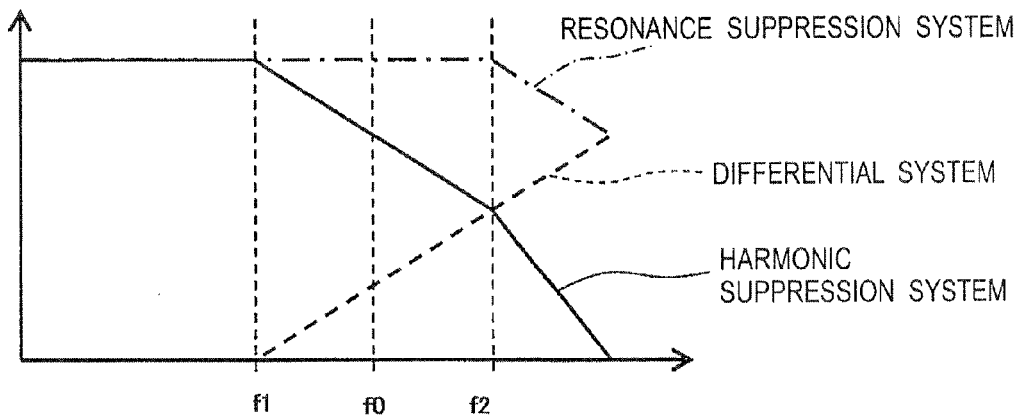
FIG. 36(A) is a chart showing a frequency characteristic of the power converter of the first embodiment.
Figure 36B:
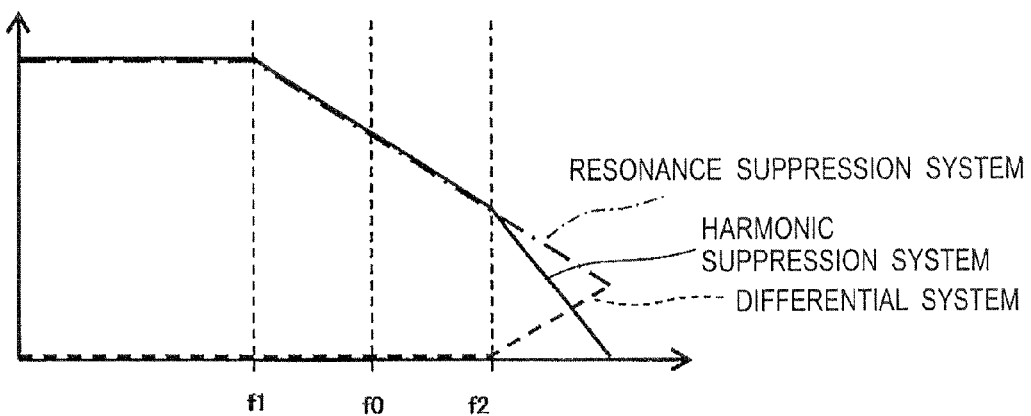
FIG. 36(B) is a chart showing a frequency characteristic of the power converter of the second embodiment.
Figure 36C:
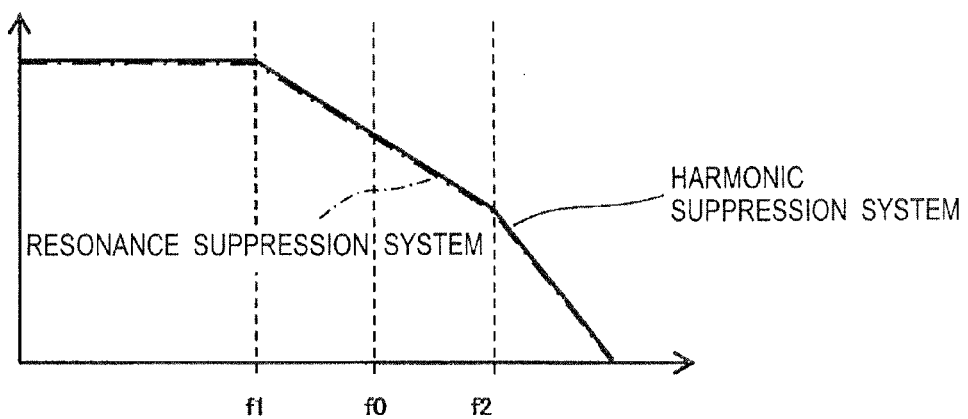
FIG. 36(C) is a chart showing a frequency characteristic of the power converter of DC voltage feedback alone.

FIG. 35 shows a cut-off frequency versus damping coefficient characteristic of the resonance suppression system as well as a cut-off frequency versus damping coefficient characteristic of the harmonic suppression system in the power converter of the second embodiment. FIG. 36(A) shows a frequency characteristic of the power converter of the first embodiment. FIG. 36(B) shows a frequency characteristic of the power converter of the second embodiment. FIG. 36(C) shows a frequency characteristic of the power converter of DC voltage feedback alone.

FIG. 35 shows a conceptual view on effects of the power converter of the second embodiment. In this case, '●' mark denotes cut-off frequency versus damping coefficient characteristics of the resonance suppression system and the harmonic suppression system (L=0.5 mH, C=40 μF). Also, '▲' mark denotes cut-off frequency versus damping coefficient characteristics of the resonance suppression system and the harmonic suppression system (L=150 μH, C=40 μF).

Also in FIG. 36(A), FIG. 36(B) and FIG. 36(C), the resonance frequency of the LC filter is set to f0, the lower-side cut-off frequency of the harmonic suppression system is set to f1, and the higher-side cut-off frequency of the harmonic suppression system is set to f2.

With combinational use of the DC voltage feedback (positive feedback of the input voltage $V_c$ of the inverter section 12 to the input current $I_0$ of the inverter section 12) as shown in FIG. 36(B), the 0 dB point of the derivative gain is set to over the resonance frequency, so that characteristics generally equivalent to the harmonic suppression system and the resonance suppression system can be obtained.

In addition, with single use of the DC voltage feedback (positive feedback of the input voltage $V_c$ of the inverter section 12 to the input current $I_0$ of the inverter section 12), since there is no differential system as shown in FIG. 36(C), equivalent characteristics of the harmonic suppression system and the resonance suppression system become equal to each other.

Figure 37A:
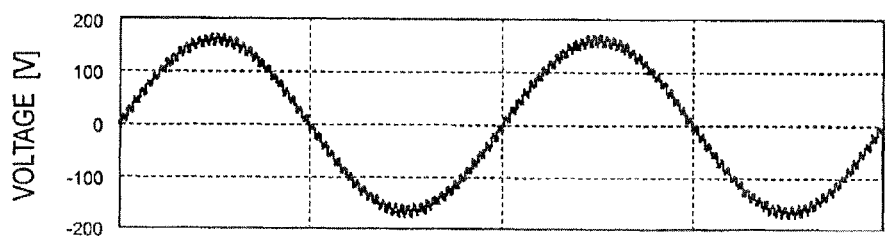
FIGS. 37(A), 37(B), 37(C), 37(D) and 37(E) are diagrams showing simulation waveforms with harmonics superimposed on the power supply voltage in the power converters of the first, second embodiments.
Figure 37B:
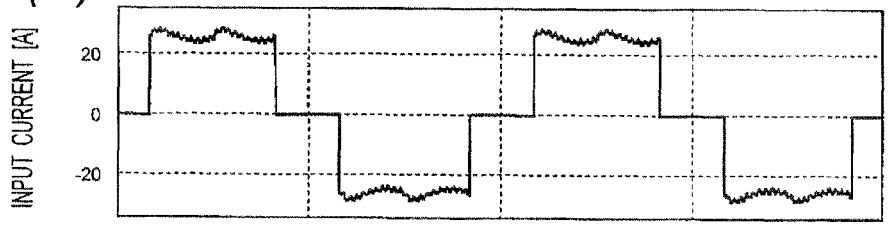
Figure 37C:
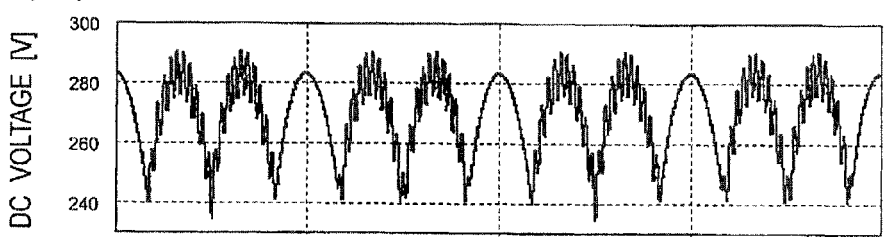
Figure 37D:
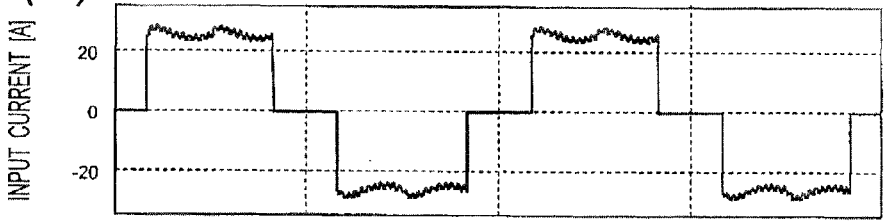
Figure 37E:
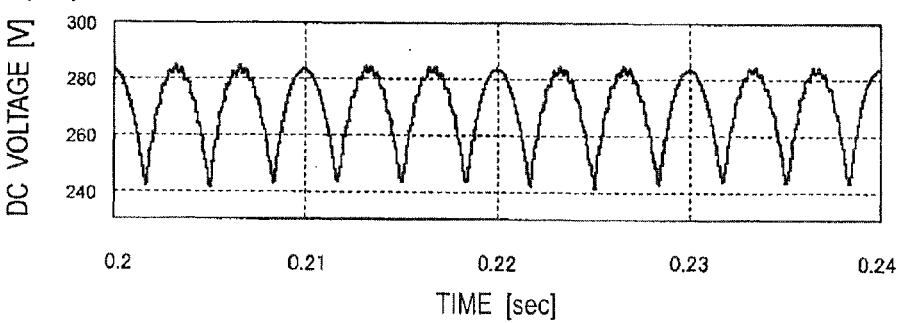
Figure 38A:
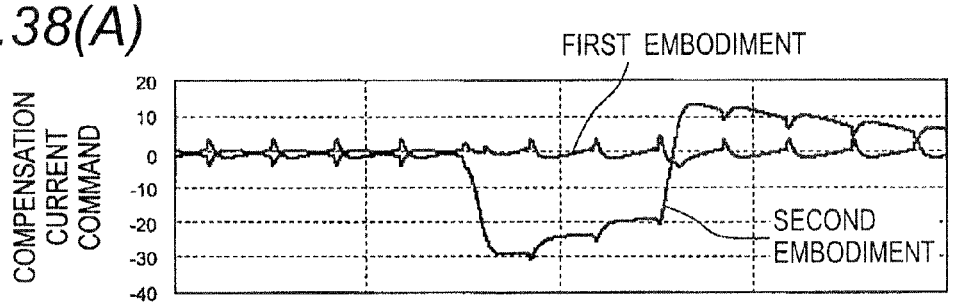
FIGS. 38(A), 38(B), 38(C), 38(D) and 38(E) are diagrams showing simulation waveforms upon voltage drops of the power supply voltage in the power converters of the first, second embodiments.
Figure 38B:
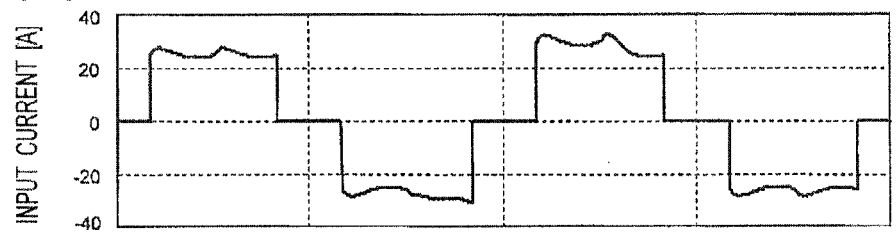
Figure 38C:
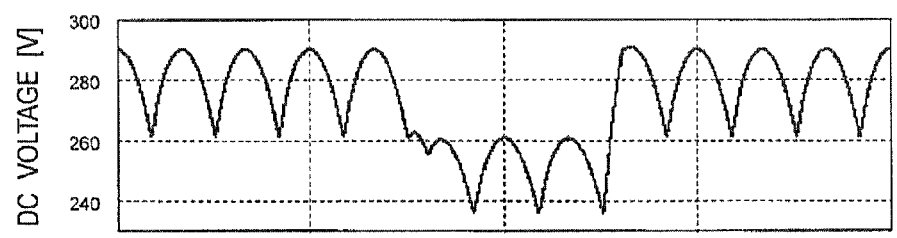
Figure 38D:
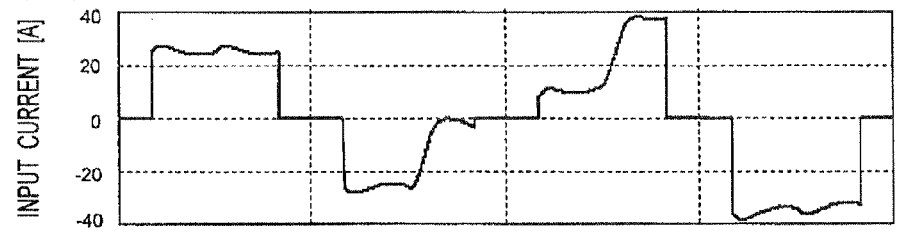
Figure 38E:
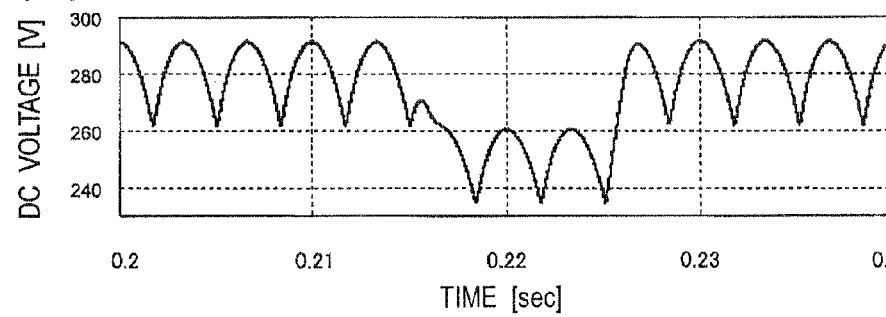

FIGS. 37(A)-37(E) show simulation waveforms with harmonics superimposed on the power supply voltage in the power converters of the first, second embodiments. FIG. 37(A) shows an input voltage waveform with a distortion on the power supply side, FIG. 37(B) shows an input current waveform of the power converter of the first embodiment, and FIG. 37(C) shows a DC voltage waveform of the DC link section in the power converter of the first embodiment. Also, FIG. 37(D) shows an input current waveform of the power converter of the second embodiment, and FIG. 37(E) shows a DC voltage waveform of the DC link section in the power converter of the second embodiment.

FIGS. 37(A)-37(E), for comparison of characteristics versus power supply distortion waveforms, simulate a case in which with a single-phase inverter device connected, a voltage distortion of 3 kHz is superimposed to 10% by a carrier current. In the power converter of the first embodiment shown in FIG. 37(B), (C), because of a wide resonance suppression band, a voltage distortion can be observed in the DC voltage waveform of the DC link section.

On the other hand, in the power converter of the second embodiment shown in FIG. 37(D), 37(E), because of a narrow resonance suppression band, there is less influence of the voltage distortion, as compared with the first embodiment.

FIGS. 38(A)-38(E) show simulation waveforms resulting upon voltage drops of the power supply voltage in the power converters of the first, second embodiments.

FIGS. 38(A)-38(E) show results of characteristic comparison upon an instantaneous voltage drop (15% drop). In the power converter of the first embodiment, because of a wide resonance suppression band shown in FIGS. 38(E), 38(C), the responsivity of output voltage becomes faster and the potential difference across the reactor L becomes smaller. As a result, there are involved less variations in compensation current command value, falling under variations of the input current corresponding to the power supply voltage.

On the other hand, in the power converter of this second embodiment, because of a low-set cut-off frequency of the high-pass filter shown in FIGS. 37(D), 37(E), there are some cases where voltage fluctuations are fed back so as to affect the compensation current, causing the input current to decrease.

Accordingly, the power converter of the first embodiment is enabled to fulfill successful control over such power supply as voltage fluctuations are involved, thus being applicable under various power supply environments.

Also, the power converter of the second embodiment is enabled to fulfill optimum control of good responsivity to the inductive load in applications to the power supply of relatively stable voltage, thus being suitable for such power supply environments.

Figure 39A:
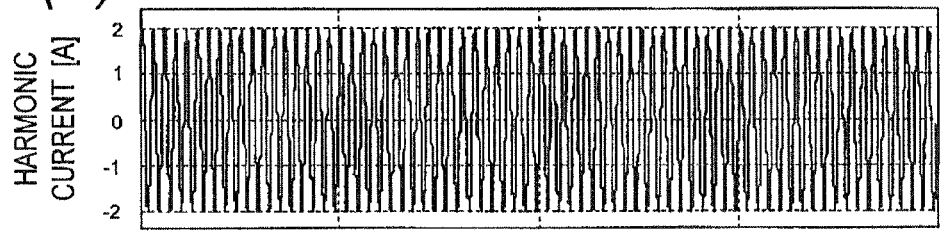
FIGS. 39(A), 39(B), 39(C), 39(D) and 39(E) are diagrams showing simulation waveforms with motor harmonic currents superimposed in the power converters of the first, second embodiments.
Figure 39B:
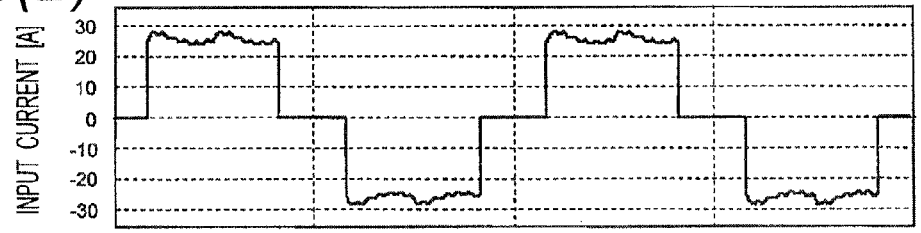
Figure 39C:
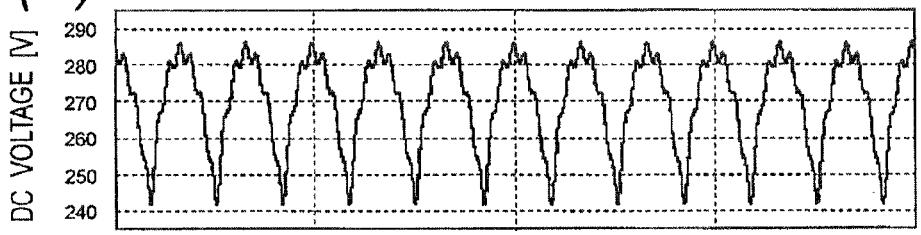
Figure 39D:
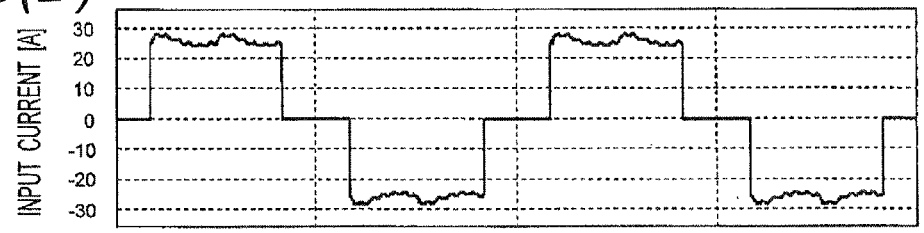
Figure 39E:
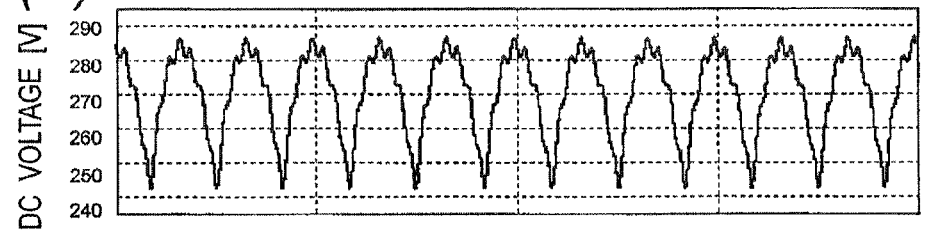

FIGS. 39(A)-39(E) show simulation waveforms with motor harmonic currents superimposed in the power converters of the first, second embodiments. FIG. 39(A) shows a waveform of a harmonic current generated on the motor side, FIG. 39(B) shows an input current waveform in the power converter of the first embodiment, and FIG. 39(C) shows a DC voltage waveform of the DC link section in the power converter of the first embodiment. Also, FIG. 39(D) shows an input current waveform in the power converter of the second embodiment, and FIG. 39(E) shows a DC voltage waveform of the DC link section in the power converter of the second embodiment.

Simulation conditions in this case are set as a power of 200 V, 50 Hz and 7 kW for input, where a harmonic current of 1800 Hz and 2A flows through the DC link section.

The harmonic suppression system of the power converter of this second embodiment is expressed by the same system as in the power converter of the first embodiment. Therefore, harmonic suppression effects of the power converter of the second embodiment shown in FIG. 39(D), (E) are similar to those of the power converter of the first embodiment shown in FIG. 39(B), (C).

According to the power converter of the second embodiment, the controller 100 controls the inverter section 12 so that a transfer characteristic of the input voltage of the inverter section 12 versus the DC voltage derived from the diode bridge 11 is given by damping characteristics by the phase lead element and the second-order lag element connected in series. Moreover, the damping coefficient $\zeta$ of the transfer characteristic of the input voltage of the inverter section 12 versus the DC voltage from the diode bridge 11 is set larger than 1. Thus, harmonics due to the inductive load can be effectively suppressed while resonance due to the LC filter is suppressed, so that optimum control of good responsivity to the inductive load such as a motor can be fulfilled.

Also, by the setting of the gain $k_1$ of the reactor voltage feedback (first feedback loop) for controlling the current flowing through the reactor L by exerting negative feedback of the voltage $V_L$ across the reactor L to the input current of the inverter section 12, as well as by the setting of the gain $k_2$ of the DC voltage feedback (second feedback loop) for controlling the current flowing through the capacitor C by exerting positive feedback of the input voltage of the inverter section 12 to the input current of the inverter section 12, it becomes implementable to set a cut-off frequency of the transfer characteristic of the input voltage of the inverter section 12 versus the DC voltage derived from the diode bridge 11, as well as a cut-off frequency of a transfer characteristic of the DC current flowing through the reactor L versus the input current of the inverter section 12, independently of each other.

Also, when the cut-off frequency of the transfer characteristic of the input voltage of the inverter section 12 versus the DC voltage derived from the diode bridge 11 and the lower cut-off frequency of the transfer characteristic of the DC current flowing through the reactor L versus the input current of the inverter section 12 are made coincident with each other by setting the gain $k_1$ of the reactor voltage feedback (first feedback loop) and the gain $k_2$ of the DC voltage feedback (second feedback loop), it becomes implementable to set a larger damping coefficient $\zeta$ because of less influences of the sampling frequency (carrier frequency) of PWM control. Further, it also becomes possible to lower the inductance value of the reactor L, allowing the reactor L to be downsized.

Also, ripple voltage components contained in the DC voltage outputted from the diode bridge 11 are removed by the ripple removal section provided in the DC voltage feedback (second feedback loop) of the input voltage of the inverter section 12. Therefore, it becomes implementable to control harmonic components of the current flowing through the capacitor C by exerting positive feedback of high frequency components alone of the input voltage of the inverter section 12 to the input current of the inverter section 12 in the DC voltage feedback (second feedback loop).

Also, even in the case where the gain $k_1$ of the reactor voltage feedback (first feedback loop) of the voltage $V_L$ across the reactor L detected by the voltage detector 101 is set approximately to zero, harmonics due to the inductive load can be effectively suppressed while resonance due to the LC filter is suppressed, by the setting of the cut-off frequency of the transfer characteristic of the input voltage of the inverter section 12 versus the DC voltage derived from the diode bridge 11.

Also, in the case where the gain $k_1$ of the reactor voltage feedback (first feedback loop) of the voltage $V_L$ across the reactor L detected by the voltage detector 101 is set by a resistance value of a resistor connected in parallel to both ends of the reactor L, there are less influences of the sampling frequency (carrier frequency) of the PWM control, so that the stability of the control is improved.

Also, as in the first embodiment, the inductance $L_R$ [H] of the reactor L is determined based on the standard capacitance $C_R$ of the capacitor C and the resonance frequency of the LC filter so as to meet the condition that $L/C<L_R/C_R$, by which the reactor L can be downsized while resonance due to the LC filter and harmonics due to the inductive load are suppressed.

Also, by satisfying the condition that $L/C>L_R/C_R$, higher-order harmonics due to the inductive load can be suppressed while resonance due to the LC filter is suppressed.

Also, by the setting that the cut-off frequency of the transfer characteristic of the DC current flowing through the reactor L versus input current of the inverter section 12 is larger than the repetition frequency of ripple components contained in a DC voltage outputted from the diode bridge 11, it becomes possible to fulfill control suitable for the inverter section 12 that performs control to compensate ripple components contained in the DC voltage outputted from the diode bridge 11.

Also, by the setting that the cut-off frequency of the transfer characteristic of the DC current flowing through the reactor L versus input current of the inverter section 12 is smaller than the repetition frequency of ripple components contained in a DC voltage outputted from the diode bridge 11, it becomes possible to fulfill control suitable for the inverter section 12 that performs constant current control.

Also, since AC components of resonance current and harmonic current flow through the reactor L connected between one output end of the diode bridge 11 and one input end of the inverter section 12, detecting a voltage across the reactor L by the voltage detector 101 makes it possible to obtain a voltage signal suitable for control of resonance suppression and harmonic suppression of the inverter section 12.

The above-described first, second embodiments have been explained on power converters in which three-phase AC voltage is rectified to DC voltage and then the resulting DC voltage is converted to three-phase AC voltage and outputted as such. However, the invention may also be applied to power converters in which single-phase or three- or more-phase AC voltage is rectified to DC voltage and then the resulting DC voltage is converted to single-phase or three- or more-phase AC voltage and outputted as such.

Also, the first, second embodiments have been explained on power converters in which the reactor L as an inductance element is connected between one output end of the diode bridge 11 and one input end of the inverter section 12. However, without being limited to this, the inductance element may be connected between one output end of an AC power supply for supplying AC voltage and one input end of the rectifier section.

In this case, with the construction in which the single-phase AC voltage is inputted to the rectifier section, AC components of resonance current and harmonic current flow through the inductance element connected between one output end of an AC power supply for supplying AC voltage and one input end of the rectifier section. Therefore, by detecting a voltage across the inductance element by a voltage detector, a voltage signal suitable for control of the inverter section can be obtained. Also, with a construction in which polyphase AC voltage is inputted to the rectifier section, AC components of resonance current and harmonic current of each phase flow through the inductance element connected for each phase between one output end of an AC power supply for supplying AC voltage and one input end of the rectifier section. Therefore, by detecting voltages across the individual inductance elements by the voltage detectors, respectively, voltage signals suitable for control of resonance suppression and harmonic suppression of the inverter section can be obtained.

Although specific embodiments of the present invention have been described hereinabove, yet the invention is not limited to the above embodiments and may be carried out as they are changed and modified in various ways within the scope of the invention.

Furthermore, as is also allowable, a power converter according to the present invention comprises:

a rectifier section for rectifying a single-phase or polyphase AC voltage into a DC voltage;

an inverter section of PWM control for converting the DC voltage outputted from the rectifier section into an AC voltage and outputting the AC voltage;

a capacitance element connected between input ends of the inverter section;

an inductance element making up an LC filter in combination with the capacitance element;

a voltage detector for detecting a voltage across the inductance element; and a controller for controlling the inverter section on a basis of a voltage across the inductance element detected by the voltage detector, wherein the LC filter has a resonance frequency set therein so as to pass therethrough ripple current components contained in the DC current outputted from the rectifier section and to damp current components of a frequency equal to a carrier frequency of the inverter section, and the controller controls the inverter section so that a damping coefficient $\zeta$ of a transfer characteristic of input voltage of the inverter section versus the DC voltage from the rectifier section is set larger than 1, by which a cut-off frequency of the transfer characteristic becomes higher than a resonance frequency of the LC filter and moreover a cut-off frequency of a transfer characteristic of a DC current flowing through the inductance element versus an input current of the inverter section becomes lower than the resonance frequency of the LC filter.

With this constitution, it becomes implementable to raise the cut-off frequency of the resonance suppression system for suppressing resonance due to the LC filter in terms of transfer characteristics of the input voltage of the inverter section versus the DC voltage from the rectifier section, and to lower the cut-off frequency of the harmonic suppression system for suppressing harmonics due to the inductive load in terms of transfer characteristics of the DC current flowing through the inductance element versus the input current of the inverter section, Since the controller controls the inverter section based on such transfer characteristics of the control system as shown above, harmonics due to the inductive load can be effectively suppressed while resonance due to the LC filter is suppressed, so that optimum control of good responsivity to the inductive load such as a motor can be fulfilled.

In one embodiment of the invention, there is provided a power converter as described above, wherein given a capacitance C[F] of the capacitance element, an inductance L[H] of the inductance element, a standard capacitance $C_R$[F] of the capacitance element, and an inductance $L_R$[H] of the inductance element determined by the standard capacitance $C_R$[F] of the capacitance element and the resonance frequency of the LC filter, it is satisfied that $$L/C<L_R/C_R.$$

In this case, the term, standard capacitance of the capacitance element, refers to a capacitance value that should be determined so as to prevent breakdowns of circuit elements due to operation halt of the inverter section, while suppressing harmonics, based on an inductance of the inductive load such as a motor, power supply inductance, charging voltage of the capacitance element, power consumption of the motor load, frequency of ripple components of the DC link voltage, and motor exciting current. In addition, with combinational use of a CD clamp or other circuit for absorbing load induced power, the standard capacitance is determined by the permissible ripple current or temperature-increased value of the capacitance element.

According to this embodiment, the inductance element can be downsized while resonance due to the LC filter and harmonics due to the inductive load are suppressed.

Also, in one embodiment, there is provided a power converter as described above, wherein given a capacitance C[F] of the capacitance element, an inductance L[H] of the inductance element, a standard capacitance $C_R$[F] of the capacitance element, and an inductance $L_R$[H] of the inductance element determined by the standard capacitance $C_R$[F] of the capacitance element and the resonance frequency of the LC filter, it is satisfied that $$L/C > L_R/C_R.$$

According to this embodiment, higher-order harmonics due to the inductive load can be suppressed while resonance due to the LC filter is suppressed.

Also, in one embodiment, there is provided a power converter as described above, wherein a cut-off frequency that is a transfer characteristic of a DC current flowing through the inductance element versus input current of the inverter section is larger than a repetition frequency of ripple components contained in the DC voltage outputted from the rectifier section.

According to this embodiment, by the setting that the cut-off frequency that is a transfer characteristic of the DC current flowing through the inductance element versus input current of the inverter section is larger than the repetition frequency of ripple components contained in a DC voltage outputted from the rectifier section, it becomes possible to fulfill control suitable for the inverter section that performs control to compensate ripple components contained in the DC voltage outputted from the rectifier section.

Also, in one embodiment, there is provided a power converter as described above, wherein a cut-off frequency that is a transfer characteristic of a DC current flowing through the inductance element versus input current of the inverter section is smaller than a repetition frequency of ripple components contained in the DC voltage outputted from the rectifier section.

According to this embodiment, by the setting that the cut-off frequency that is a transfer characteristic of the DC current flowing through the inductance element versus input current of the inverter section is smaller than the repetition frequency of ripple components contained in a DC voltage outputted from the rectifier section, it becomes possible to fulfill control suitable for the inverter section that performs constant current control.

Also, in one embodiment, there is provided a power converter as described above, wherein the inductance element is connected between one output end of the rectifier section and one input end of the inverter section.

According to this embodiment, since AC components of resonance current and harmonic current flow through the inductance element connected between one output end of the rectifier section and one input end of the inverter section, detecting a voltage across the inductance element by the voltage detector makes it possible to obtain a voltage signal suitable for control of resonance suppression and harmonic suppression of the inverter section.

Also, in one embodiment, there is provided a power converter as described above, wherein the inductance element is connected between one output end of an AC power supply for supplying the AC voltage and one input end of the rectifier section.

According to this embodiment, with the construction in which the single-phase AC voltage is inputted to the rectifier section, AC components of resonance current and harmonic current flow through the inductance element connected between one output end of an AC power supply for supplying AC voltage and one input end of the rectifier section. Therefore, by detecting a voltage across the inductance element by the voltage detector, a voltage signal suitable for control of the inverter section can be obtained. Also, with a construction in which polyphase AC voltage is inputted to the rectifier section, AC components of resonance current and harmonic current of each phase flow through the inductance element connected for each phase between one output end of an AC power supply for supplying AC voltage and one input end of the rectifier section. Therefore, by detecting voltages across the individual inductance elements by the voltage detectors, respectively, voltage signals suitable for control of resonance suppression and harmonic suppression of the inverter section can be obtained.

What is claimed is:

1. A power converter comprising:
    a rectifier section configured to rectify a single-phase or polyphase AC voltage into a DC voltage and to output the DC voltage;
    an inverter section of PWM control configured to convert the DC voltage outputted from the rectifier section into an AC voltage and to output the AC voltage;
    a capacitance element connected between input ends of the inverter section;
    an inductance element forming part of an LC filter in combination with the capacitance element;
    a voltage detector configured to detect a voltage across the inductance element; and
    a controller configured to control the inverter section based on a voltage across the inductance element detected by the voltage detector,
    the LC filter having a resonance frequency set such that
        ripple current components contained in DC current outputted from the rectifier section passes therethrough and
        current components of a frequency equal to a carrier frequency of the inverter section are dampened, and
    the controller being further configured to control the inverter section so that
        a transfer characteristic of input voltage of the inverter section versus the DC voltage from the rectifier section becomes a damping characteristic given by a phase lead element and a second-order lag element connected in series, and
        a damping coefficient of the transfer characteristic of the input voltage of the inverter section versus the DC voltage from the rectifier section is larger than 1, and
    the controller being further configured to have a characteristic difference between a resonance suppression system for suppression of resonance due to the LC filter and a harmonic suppression system for suppression of harmonics due to an output-side inductive load of the inverter section so that cut-off frequencies of the resonance suppression system and the harmonic suppression system are different from each other.

2. The power converter as claimed in claim 1, wherein the controller includes
   a first feedback loop configured to control a current flowing through the inductance element by negatively feeding back a voltage across the inductance element detected by the voltage detector to an input current of the inverter section, and
   a second feedback loop configured to control a current flowing through the capacitance element by positively feeding back the input voltage of the inverter section to the input current of the inverter section, and
   a first gain of the first feedback loop and a second gain of the second feedback loop are set on that the transfer characteristic of the input voltage of the inverter section versus the DC voltage from the rectifier section and a transfer characteristic of a DC current flowing through the inductance element versus the input current of the inverter section become predetermined transfer characteristics, respectively.

3. The power converter as claimed in claim 2, wherein the controller
   a ripple removal section configured to remove ripple voltage components contained in the DC voltage outputted from the rectifier section in the second feedback loop of the input voltage of the inverter section.

4. The power converter as claimed in claim 3, wherein the first gain of the first feedback loop of the voltage across the inductance element detected by the voltage detector is set approximately to zero.

5. The power converter as claimed in claim 3, further comprising:
   a resistor connected in parallel to both ends of the inductance element,
   the first gain of the first feedback loop of the voltage across the inductance element detected by the voltage detector is set by a resistance value of the resistor.

6. The power converter as claimed in claim 2, wherein the first gain of the first feedback loop of the voltage across the inductance element detected by the voltage detector is set approximately to zero.

7. The power converter as claimed in claim 6, further comprising:
   a resistor connected in parallel to both ends of the inductance element,
   the first gain of the first feedback loop of the voltage across the inductance element detected by the voltage detector is set by a resistance value of the resistor.

8. The power converter as claimed in claim 2, further comprising:
   a resistor connected in parallel to both ends of the inductance element,
   the first gain of the first feedback loop of the voltage across the inductance element detected by the voltage detector is set by a resistance value of the resistor.

9. The power converter as claimed claim 1, wherein
   a capacitance of the capacitance element is C,
   an inductance of the inductance element is L,
   a standard capacitance of the capacitance element is $C_R$,
   an inductance of the inductance element is $L_R$, and
   the inductance $L_R$ is determined by the standard capacitance $C_R$ of the capacitance element and the resonance frequency of the LC filter such that $L/C<L_R/C_R$.

10. The power converter as claimed in claim 1, wherein
    a capacitance of the capacitance element is C,
    an inductance of the inductance element is L,
    a standard capacitance of the capacitance element is $C_R$,
    an inductance of the inductance element is $L_R$, and
    the inductance $L_R$ is determined by the standard capacitance $C_R$ of the capacitance element and the resonance frequency of the LC filter such that $L/C>L_R/C_R$.

11. The power converter as claimed in claim 1, wherein the inductance element is connected between one output end of the rectifier section and one input end of the inverter section.

12. The power converter as claimed in claim 1, wherein the inductance element is connected between one output end of an AC power supply configured to supply the AC voltage and one input end of the rectifier section.

13. A power converter comprising:
    a rectifier section configured to rectify a single-phase or polyphase AC voltage into a DC voltage and to output the DC voltage;
    an inverter section of PWM control configured to convert the DC voltage outputted from the rectifier section into an AC voltage and to output the AC voltage;
    a capacitance element connected between input ends of the inverter section;
    an inductance element forming part of an LC filter in combination with the capacitance element;
    a voltage detector configured to detect a voltage across the inductance element; and
    a controller configured to control the inverter section based on a voltage across the inductance element detected by the voltage detector,
    the LC filter having a resonance frequency set such that
       ripple current components contained in DC current outputted from the rectifier section passes therethrough and
       current components of a frequency equal to a carrier frequency of the inverter section are dampened, and
    the controller being further configured to control the inverter section so that
       a transfer characteristic of input voltage of the inverter section versus the DC voltage from the rectifier section becomes a damping characteristic given by a phase lead element and a second-order lag element connected in series, and
    a damping coefficient of the transfer characteristic of the input voltage of the inverter section versus the DC voltage from the rectifier section is larger than 1;
    the controller including
       a first feedback loop tired to control a current flowing through the inductance element by negatively feeding back a voltage across the inductance element detected by the voltage detector to an input current of the inverter section, and
       a second feedback loop configured to control a current flowing through the capacitance element by positively feeding back the input voltage of the inverter section to the input current of the inverter section, and
    a first gain of the first feedback loop and a second gain of the second feedback loop being set so that the transfer characteristic of the input voltage of the inverter section versus the DC voltage from the rectifier section and a transfer characteristic of a DC current flow through the inductance element versus the input current of the inverter section become predetermined transfer characteristics, respectively, and the first gain of the first feedback loop and the second gain of the second feedback loop being set so that a cut-off frequency of the transfer characteristic of the input voltage of the inverter section versus the DC voltage from the rectifier section and a lower-side cut-off frequency of the transfer characteristic of the DC current flowing through the inductance element versus the input current of the inverter section become equal to each other.

14. The power converter as claimed in claim 13, wherein the controller a ripple removal section configured to remove ripple voltage components contained in the DC voltage outputted from the rectifier section in the second feedback loop of the input voltage of the inverter section.

15. The power converter as claimed in claim 13, wherein the first gain of the first feedback loop of the voltage across the inductance element detected by the voltage detector is set approximately to zero.

16. The power converter as claimed in claim 13, further comprising:
a resistor connected in parallel to both ends of the inductance element,
the first gain of the first feedback loop of the voltage across the inductance element detected by the voltage detector is set by a resistance value of the resistor.

17. A power converter comprising:
a rectifier section configured to rectify a single-phase or polyphase AC voltage into a DC voltage and to output the DC voltage:
an inverter section of PWM control configured to convert the DC voltage outputted from the rectifier section into an AC volt e and to output the AC voltage;
a capacitance element connected between input ends of the inverter section;
an inductance element forming part of an LC filter in combination with the capacitance element;
a voltage detector configured to detect a voltage across the inductance element; and
a controller configured to control the inverter section based on a voltage across the inductance element detected by the voltage detector,
the LC filter having a resonance frequency set such that
ripple current components contained in DC current outputted from the rectifier section passes therethrough and
current components of a frequency equal to a carrier frequency of the inverter section are dampened, and
the controller being further configured to control the inverter section so that
a transfer characteristic of input voltage of the inverter section versus the DC voltage from the rectifier section becomes a damping characteristic given by phase lead element and a second-order lag element connected in series, and
a damping coefficient of the transfer characteristic of the input voltage of the inverter section versus the DC voltage from the rectifier section is larger than 1, and
the controller being further configured to control the inverter section so that
a cut-off frequency of the transfer characteristic of the input voltage of the inverter section versus the DC voltage from the rectifier section becomes higher than a resonance frequency of the LC filter and
a cut-off frequency of a transfer characteristic of a DC current flowing through the inductance element versus the input current of the inverter section becomes lower than the resonance frequency of the LC filter.

18. A power converter comprising:
rectifier section configured rectify a single-phase or polyphase AC voltage into a DC voltage and to output the DC voltage;
an inverter section of PWM control configured to convert the DC voltage outputted from the rectifier section into an AC voltage and to output the AC voltage;
a capacitance element connected between input ends of the inverter section;
an inductance element forming part of an LC filter in combination with the capacitance element;
a voltage detector configured to detect a voltage across the inductance element; and
a controller configured to control the inverter section based on a voltage across the inductance element detected by the voltage detector,
the LC filter having a resonance frequency set such that
ripple current components contained in DC current outputted from the rectifier section passes therethrough and
current components of a frequency equal to a carrier frequency of the inverter section are dampened, and
the controller being further configured to control the inverter section so that
a transfer characteristic of input voltage of the inverter section versus the DC voltage from the rectifier section becomes a damping characteristic given by a phase lead element and a second-order lag element connected in series, and
a damping coefficient of the transfer characteristic of the input voltage of the inverter section versus the DC voltage from the rectifier section is larger than 1, and
a cut-off frequency of a transfer characteristic of a DC current flowing through the inductance element versus input current of the inverter section being larger than a repetition frequency of ripple voltage components contained in the DC voltage outputted from the rectifier section.

19. A power converter comprising:
a rectifier section configured to rectify a single-phase or polyphase AC voltage into a DC voltage and to output the DC voltage;
an inverter section of PWM control configured to convert the DC voltage outputted from the rectifier section into an AC voltage and to output the AC voltage;
a capacitance element connected between input ends of the inverter section;
an inductance element forming part of an LC filter in combination with the capacitance element;
a voltage detector configured to detect a voltage across the inductance element; and
a controller configured to control the inverter section based on a voltage across the inductance element detected by the voltage detector,
the LC filter having a resonance frequency set such that
ripple current components contained in DC current outputted from the rectifier section passes therethrough and
current components of a frequency equal to a carrier frequency of the inverter section are dampened, and
the controller being further configured to control the inverter section so that
a transfer characteristic of input voltage of the inverter section versus the DC voltage from the rectifier section becomes a damping characteristic given by a phase lead element and a second-order lag element connected in series, and a damping coefficient of the transfer characteristic of the input voltage of the inverter section versus the DC voltage from the rectifier section is larger than 1, and a cut-off frequency of a transfer characteristic of a DC current flowing through the inductance element versus input current of the inverter section being smaller than a repetition frequency of ripple voltage components contained in the DC voltage outputted from the rectifier section.

* * * * *